(12) United States Patent
Brull

(10) Patent No.: US 8,945,379 B2
(45) Date of Patent: Feb. 3, 2015

(54) STRAINER FOR PUMP

(76) Inventor: James Gregory Brull, Leander, TX (US)

( * ) Notice: Subject to any disclaimer, the term of this patent is extended or adjusted under 35 U.S.C. 154(b) by 230 days.

(21) Appl. No.: 13/341,886

(22) Filed: Dec. 30, 2011

(65) Prior Publication Data

US 2013/0180901 A1 Jul. 18, 2013

(51) Int. Cl.
*B01D 29/00* (2006.01)
*B01D 29/94* (2006.01)
*B01D 29/66* (2006.01)
*B01D 29/35* (2006.01)
*E04H 4/12* (2006.01)

(52) U.S. Cl.
CPC .............. *B01D 29/009* (2013.01); *B01D 29/94* (2013.01); *B01D 29/668* (2013.01); *B01D 29/35* (2013.01); *B01D 29/66* (2013.01); *E04H 4/1218* (2013.01); *E04H 4/1245* (2013.01)
USPC .................. 210/167.12; 210/411; 210/333.01; 210/427

(58) Field of Classification Search
None
See application file for complete search history.

(56) References Cited

U.S. PATENT DOCUMENTS

| | | | |
|---|---|---|---|
| 504,438 | A | 9/1893 | Messler |
| 3,138,552 | A | 6/1964 | Richards |
| 3,252,575 | A | 5/1966 | Jacuzzi |
| 3,275,151 | A | 9/1966 | Carr |
| 3,365,064 | A | 1/1968 | Horan, Jr |
| 3,823,831 | A | 7/1974 | LeBlanc, Jr. |
| 4,328,103 | A | 5/1982 | Kraeling et al. |
| 4,781,825 | A | 11/1988 | Grimes et al. |
| 5,152,891 | A | 10/1992 | Netkowicz et al. |
| 5,230,366 | A | 7/1993 | Marandi |
| 5,370,791 | A | 12/1994 | Lescovich et al. |
| 5,401,396 | A | 3/1995 | Lescovich et al. |
| 5,467,796 | A | 11/1995 | Pettinaroli et al. |
| 5,800,702 | A | 9/1998 | Taylor-McCune et al. |
| 7,105,090 | B2 * | 9/2006 | Choo ................. 210/333.1 |
| 7,297,265 | B1 | 11/2007 | Booth et al. |
| 7,360,611 | B2 | 4/2008 | Sims et al. |
| 7,802,739 | B2 | 9/2010 | Scorvo et al. |
| 8,002,983 | B2 | 8/2011 | Wanni et al. |

FOREIGN PATENT DOCUMENTS

JP 200468004 A 9/2004

OTHER PUBLICATIONS

"Poro-Edge Automatic Water Strainer", R.P. Adams <retrieved on Nov. 10, 2011 from: http://www.rpadams.com/products/industrialfiltration/autoselfcleaning/>.

* cited by examiner

*Primary Examiner* — Terry Cecil
(74) *Attorney, Agent, or Firm* — Royston Rayzor Vickery & Williams L.L.P.; William P. Glenn, Jr.

(57) ABSTRACT

A pool pump strainer having a rotatable trim assembly within a flooded housing cavity. A suction inlet and filtered suction outlet pair and a backwash inlet and backwash outlet pair are formed in and pass through opposite regions of a housing with at least 30 degrees between each part of a pair. A strainer disposed inside a conduit fixed between a pair of shutter plates makes up the trim assembly which is rotated between strainer and backwater positions by a stem extending through the housing. In the strainer position, water is drawn through the strainer to catch debris and then passes to the pump's suction side. In the backwash position, water is drawn through the flooded housing cavity to the suction side of the pump by a shunt. Thereafter, water discharged from the pump flows under pressure across the strainer to dislodge debris to be deposited into a catch box.

12 Claims, 45 Drawing Sheets

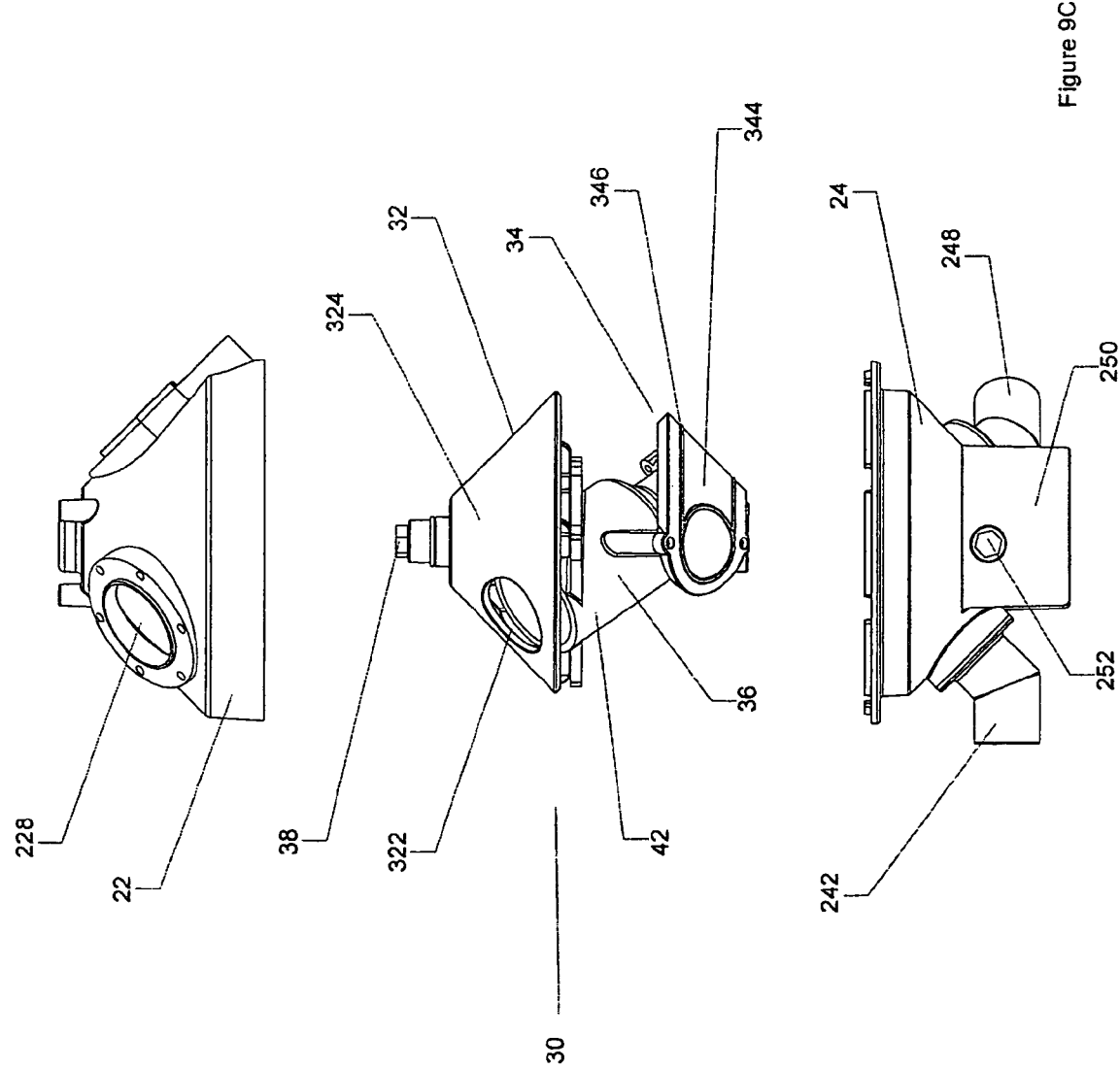

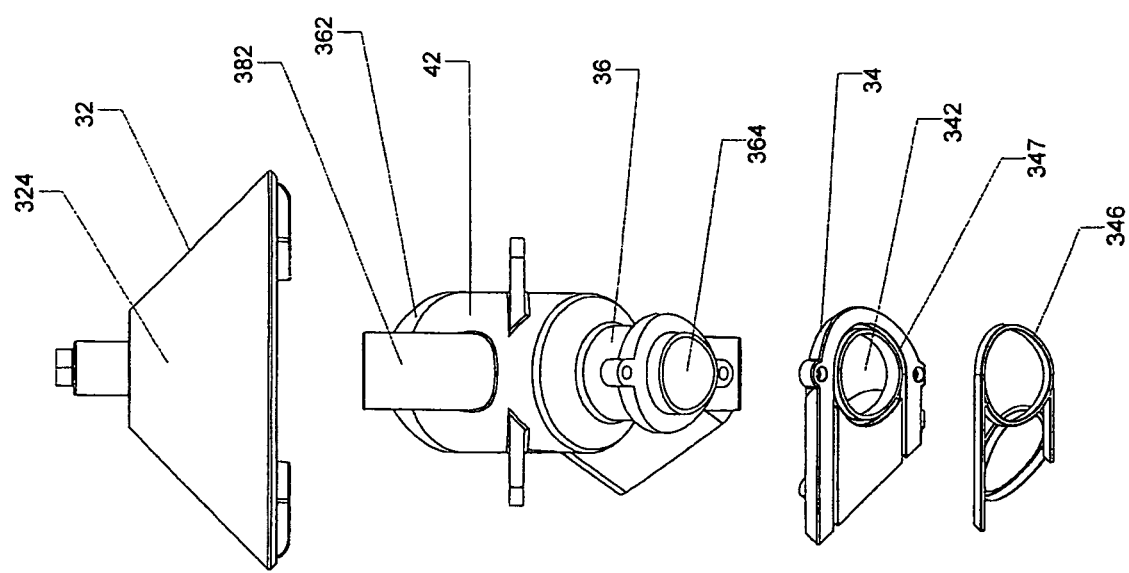

STRAINER FOR PUMP

CROSS-REFERENCES TO RELATED APPLICATIONS

Not Applicable

FEDERALLY SPONSORED RESEARCH OR DEVELOPMENT

Not Applicable

PARTIES TO A JOINT RESEARCH AGREEMENT

Not Applicable

REFERENCE TO A SEQUENCE LISTING

Not Applicable

BACKGROUND OF THE INVENTION

Field of the Invention

The present invention relates to the filtering or straining of solids from liquids from the suction side of a pump. More particularly, the present invention relates to an apparatus for straining solid particulates and/or debris from water prior to passage through a pool pump without losing suction on the pump.

Pumps are commonly used in the circulation of water in pools. Water is pulled from the pool by a pipe (or line) connected to the suction side of a pump. Water discharge from the pump is pushed through either a sand trap or diatomaceous earth filter to remove small particulate matter. The discharge side of the pump is typically connected to the sand trap or diatomaceous earth filter by a discharge pipe (or line). Thereafter the water is returned to the pool. Large debris, such as leaves, suspended in the pool water and transported through the suction side of the pump may restrict, plug or damage the pump. To minimize such restriction or damage, a strainer is positioned some point between the pool and the suction side of the pump to prevent large debris from entering the pump. In contrast to the sand trap or diatomaceous earth filter operating on the pressure side of the pump, a strainer operates on the suction side of the pump to remove debris.

Typically a strainer basket is positioned upstream of the pump in the pool weir to collect floating debris such as leaves and grass trimmings. In other arrangements, a strainer is positioned immediately upstream of the pump suction to separate debris from the water. There is no efficient means to backwash such strainers without turning off the pump and/or removing the strainer basket or strainer from its housing. Typically removal of the strainer or strainer basket causes a loss of suction by the pump.

A system is needed to allow cleaning of the strainer of debris without breaking the suction between the pool and the pump. There is also a need for a reliable means of removing debris from the strainer so that strainer plugging by excessive particulate/debris entrapment can be identified and remedied without interrupting the flow of the water. The means must be usable at normal operating pressures so that it can serve to protect the pump from clogging.

SUMMARY OF THE INVENTION

The invention contemplates a strainer based upon a two way, two position rotating trim assembly within a cavity of a strainer housing. The trim assembly includes a strainer positioned within a conduit bore. The trim assembly has a first and second shutter fixed at opposite ends of the conduit. The first and second shutters direct the flow of water across the strainer and within the housing cavity. The strainer is in the form of a mesh or a bucket with a plurality of holes to separate debris from water traveling through the conduit to the suction side of the pump. A shunt fluidly connected between the pool and the main cavity of the housing keeps the housing flooded with water.

A pre-strainer suction inlet and a backwash outlet are positioned in the first end of the strainer housing. A filtered suction outlet and a backwash inlet are positioned in the second end of the rotary valve housing. When the trim assembly is in the first (or strainer) position, the first and second shutters fluidly block the backwash outlet and backwash inlet; and the conduit is aligned with the pre-strainer suction inlet and the filtered suction outlet whereby the suction side of the pump draws water through the conduit and across the strainer thereby separating suspended debris from the water. When the trim assembly is in the second (or backwash) position, the first shutter blocks only the pre-strainer suction inlet thereby causing the pump to draw water from the main cavity through the filtered suction outlet and discharge it into the backwash inlet which is aligned with the backwash outlet to allow water to pass through the strainer to dislodge debris from the strainer and exit the housing through the backwash outlet. In short, when the trim assembly is rotated from one position to another, the water flow though the conduit and across the strainer is reversed without loss of pump suction. In this manner, it is possible to strain suspended debris from the water without turning the pump off.

Accordingly, an object of the instant invention is to provide a backwashable strainer on the suction side of the pump that is easy to clean without removal of the strainer from the valve housing. Another object of the instant invention is to provide a strainer on the suction side of the pump that is back washable without starving the pump of its supply of water. Another object of the instant invention is to remove debris from a strainer on the suction side of the pump and discharge it to the exterior of the valve housing.

Other and further objects, benefits, and advantages of the instant invention have been described above, and further. The detailed description and drawings which follow.

Figure 1:
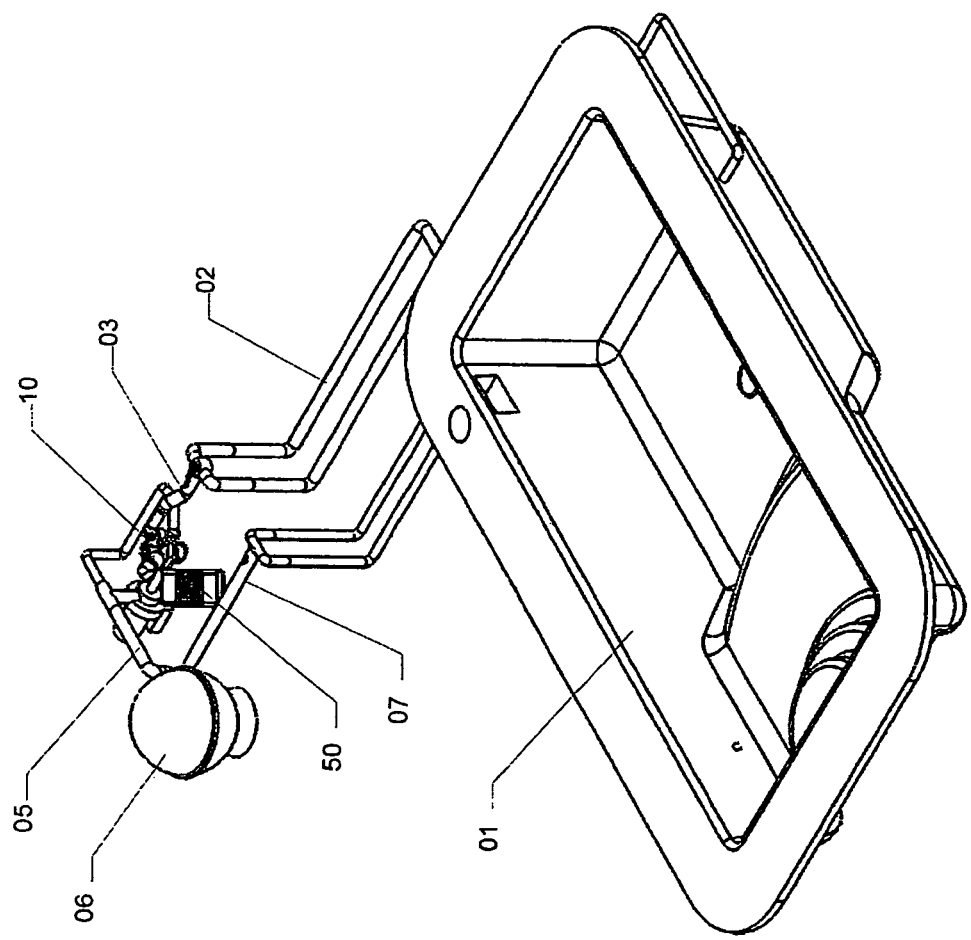
FIG. 1 depicts an isometric view of a pool circulation and filtering system including one embodiment of the instant inventive strainer device 10.
Figure 2:
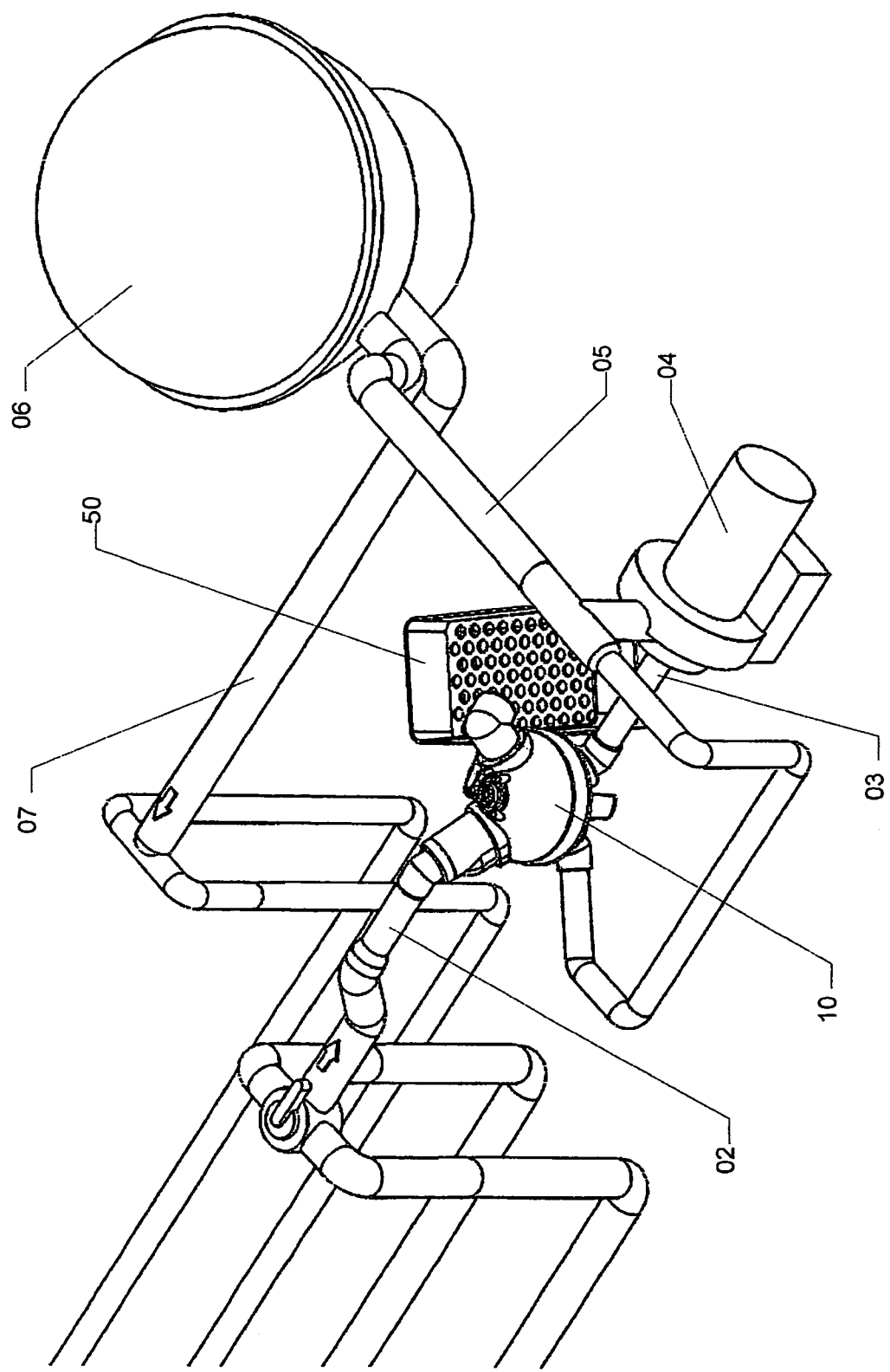
FIG. 2 depicts an isometric detailed view of a pool circulation filtering system including one embodiment of the instant inventive strainer device 10.
Figure 3:
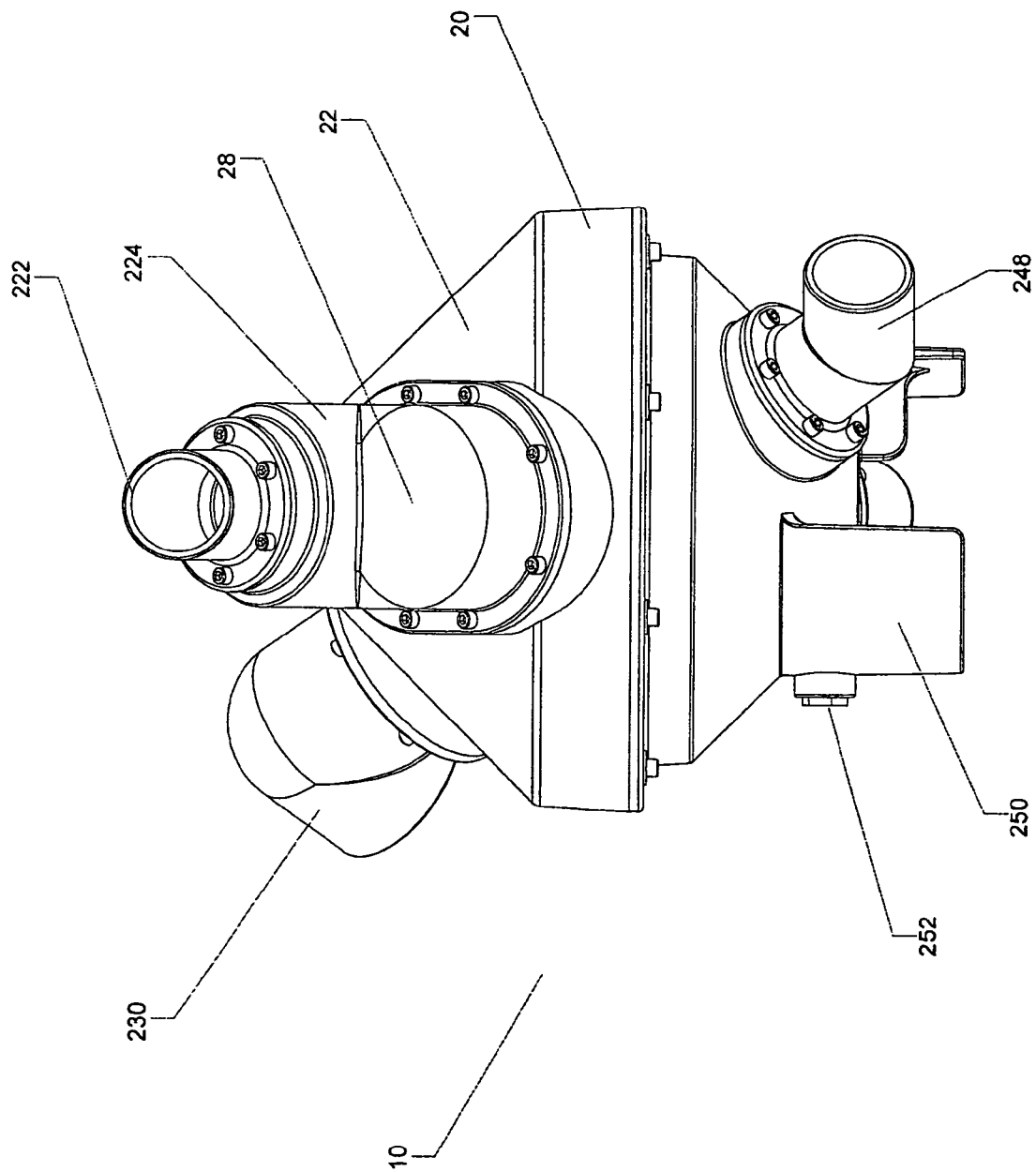
FIG. 3 is a plan view of an embodiment of the instant inventive strainer device 10 showing the exterior of the strainer housing 20 with the attached pre-strainer housing 224, backwash outlet fitting 230, backwash inlet fitting 248, and shunt 28.
Figure 4:
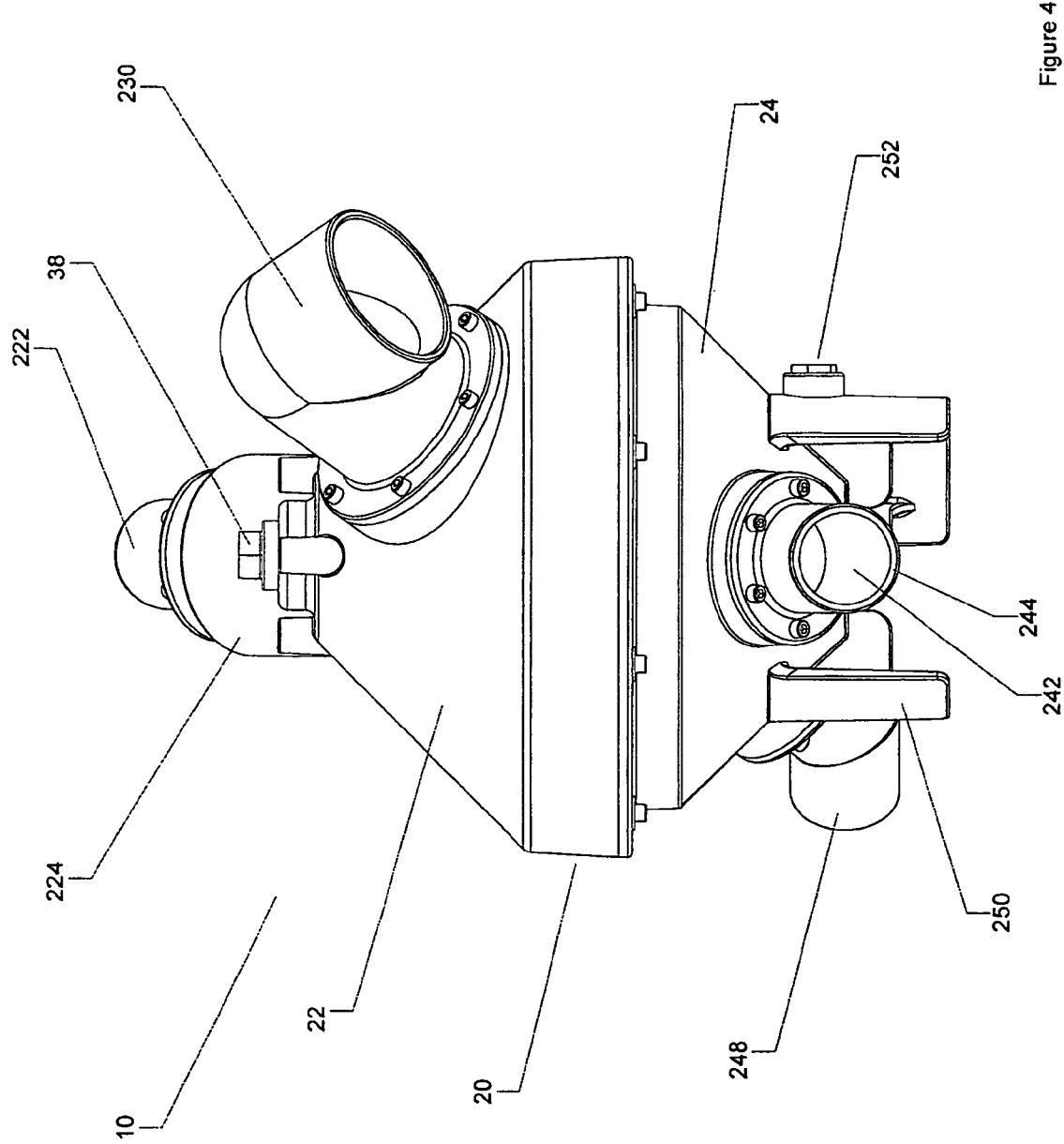
FIG. 4 is a plan view of an embodiment of the instant inventive strainer device 10 depicting the pre-strainer suction inlet 222, backwash outlet fitting 230, filtered suction outlet 242, and backwash inlet fitting 248 attached to the strainer housing 20.
Figure 5:
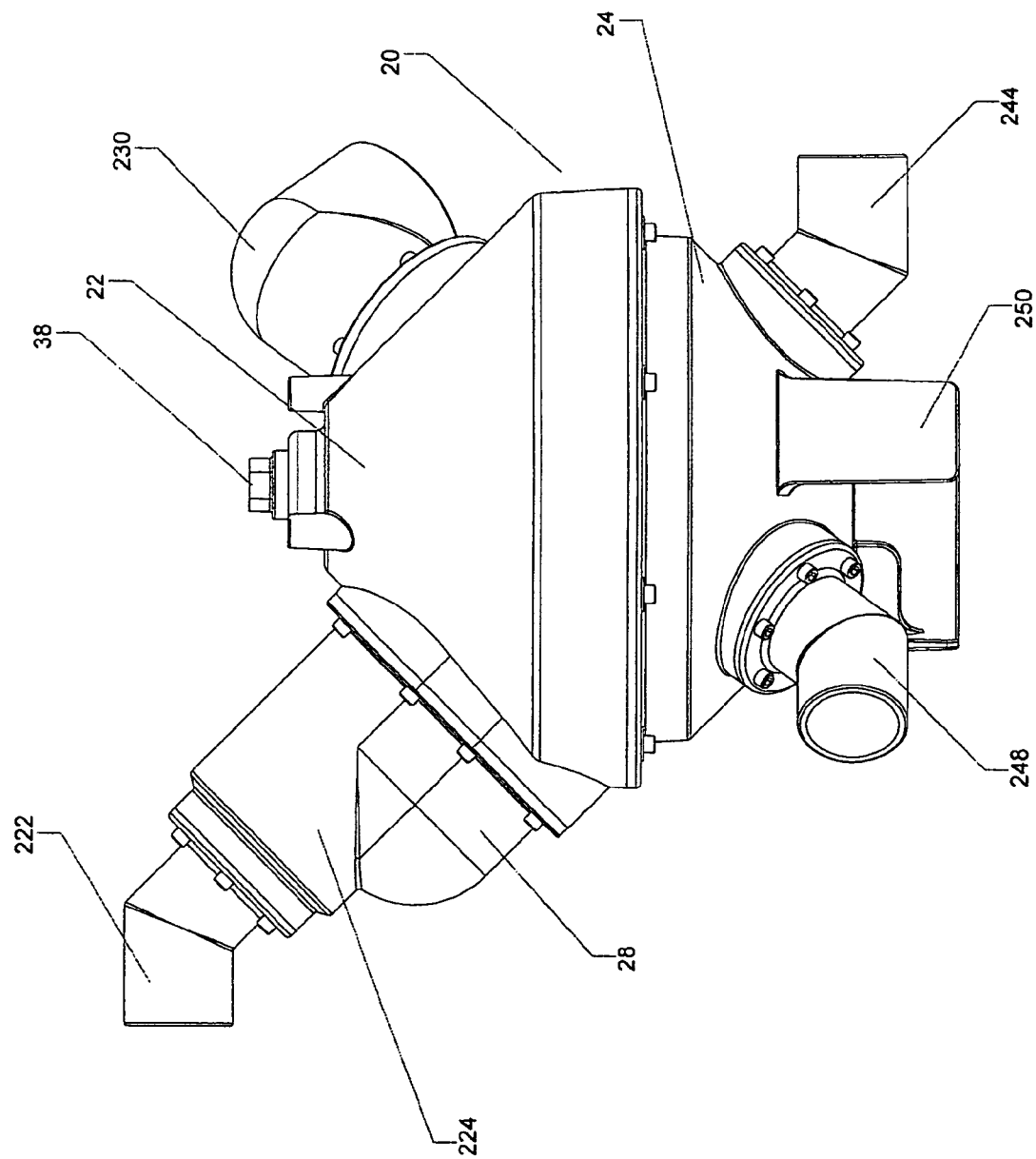
FIG. 5 is a plan view of an embodiment of the instant inventive strainer device, 10 depicting the strainer housing 20 attached to a pre-strainer suction fitting 222, shunt 28, backwash outlet fitting, backwash inlet fitting and filtered suction outlet fitting.
Figure 6:
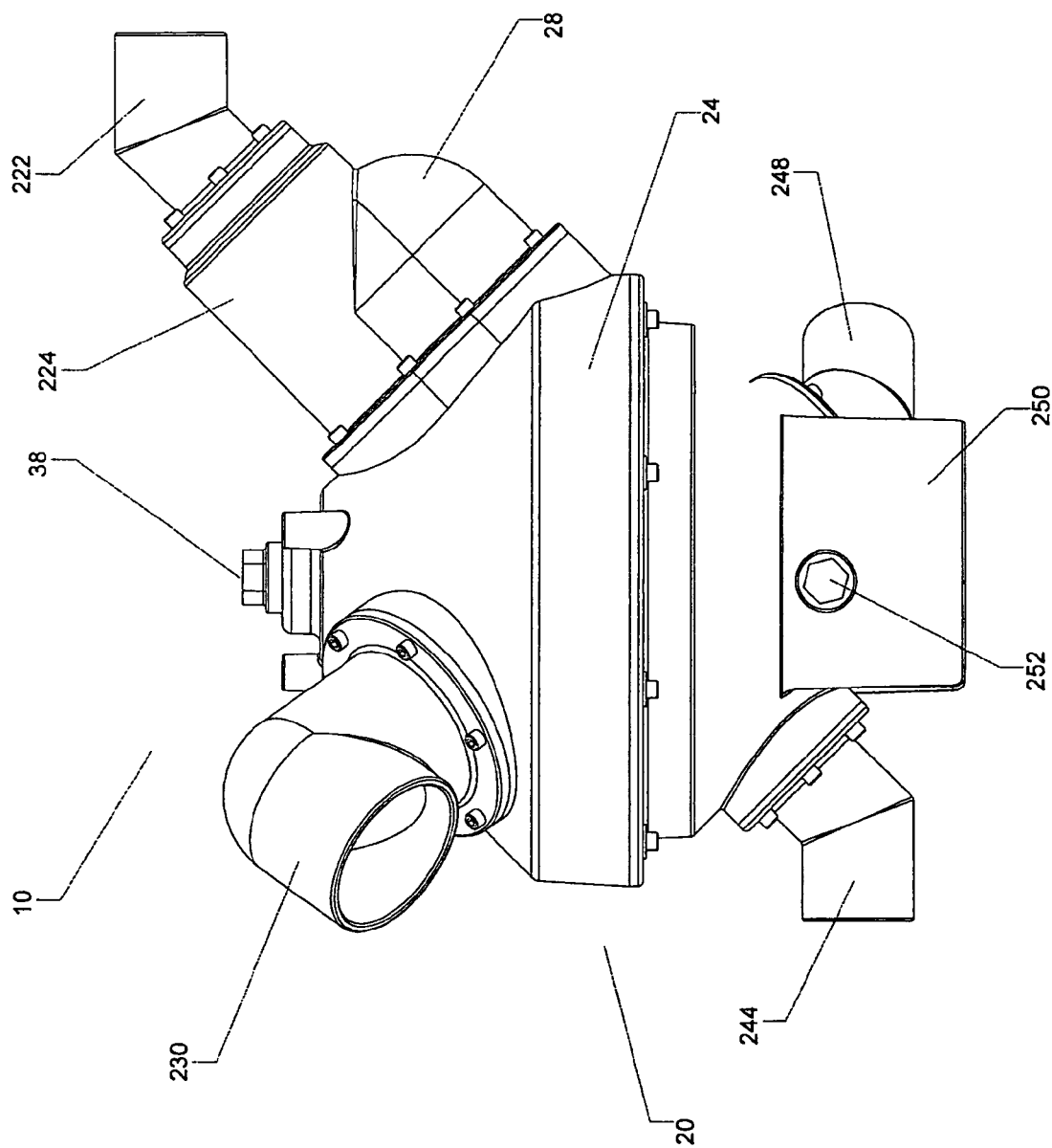

FIG. 6 is a plan view of an embodiment of the instant inventive strainer device, depicting the strainer housing 20 attached to a pre-strainer suction fitting 222, shunt 28, backwash outlet fitting, backwash inlet fitting and filtered suction outlet fitting.

Figure 7:
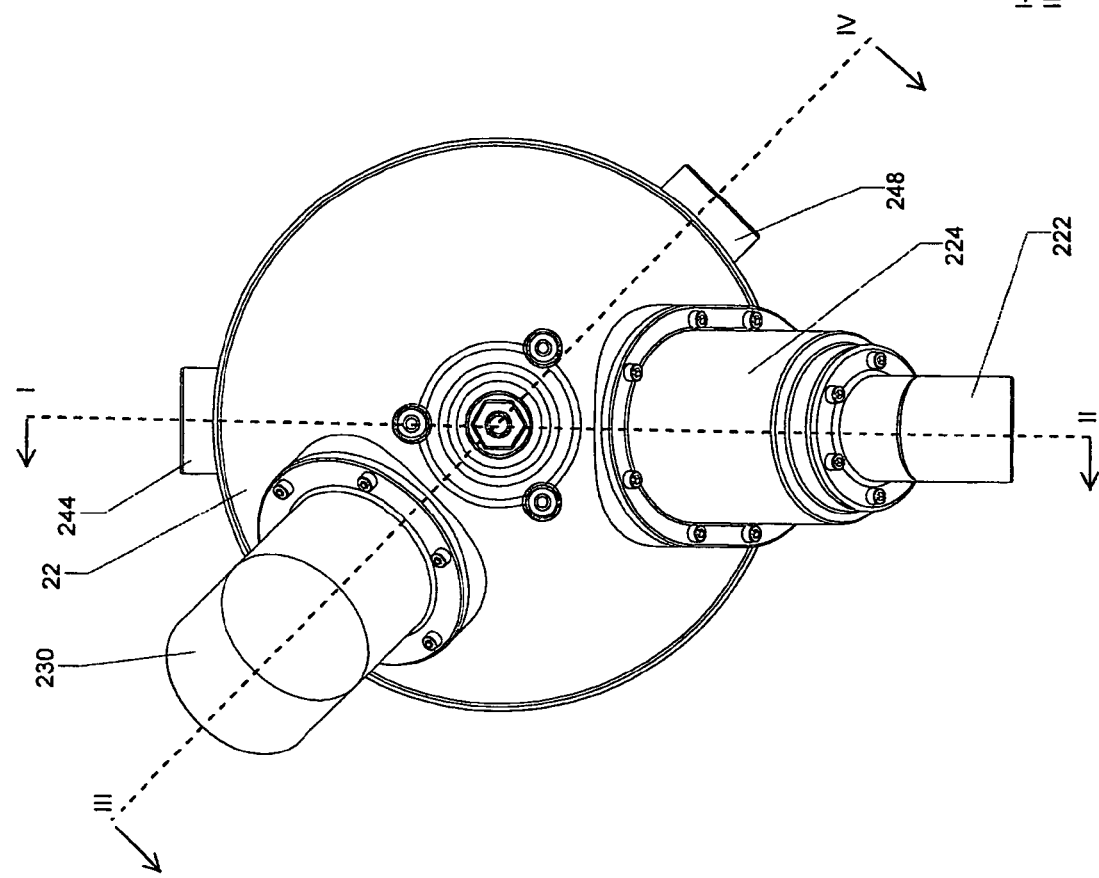

FIG. 7 is a top view of an embodiment of the instant inventive strainer device, depicting the pre-strainer housing 224, backwash outlet fitting 230 fixed to the strainer housing 20.

Figure 8:
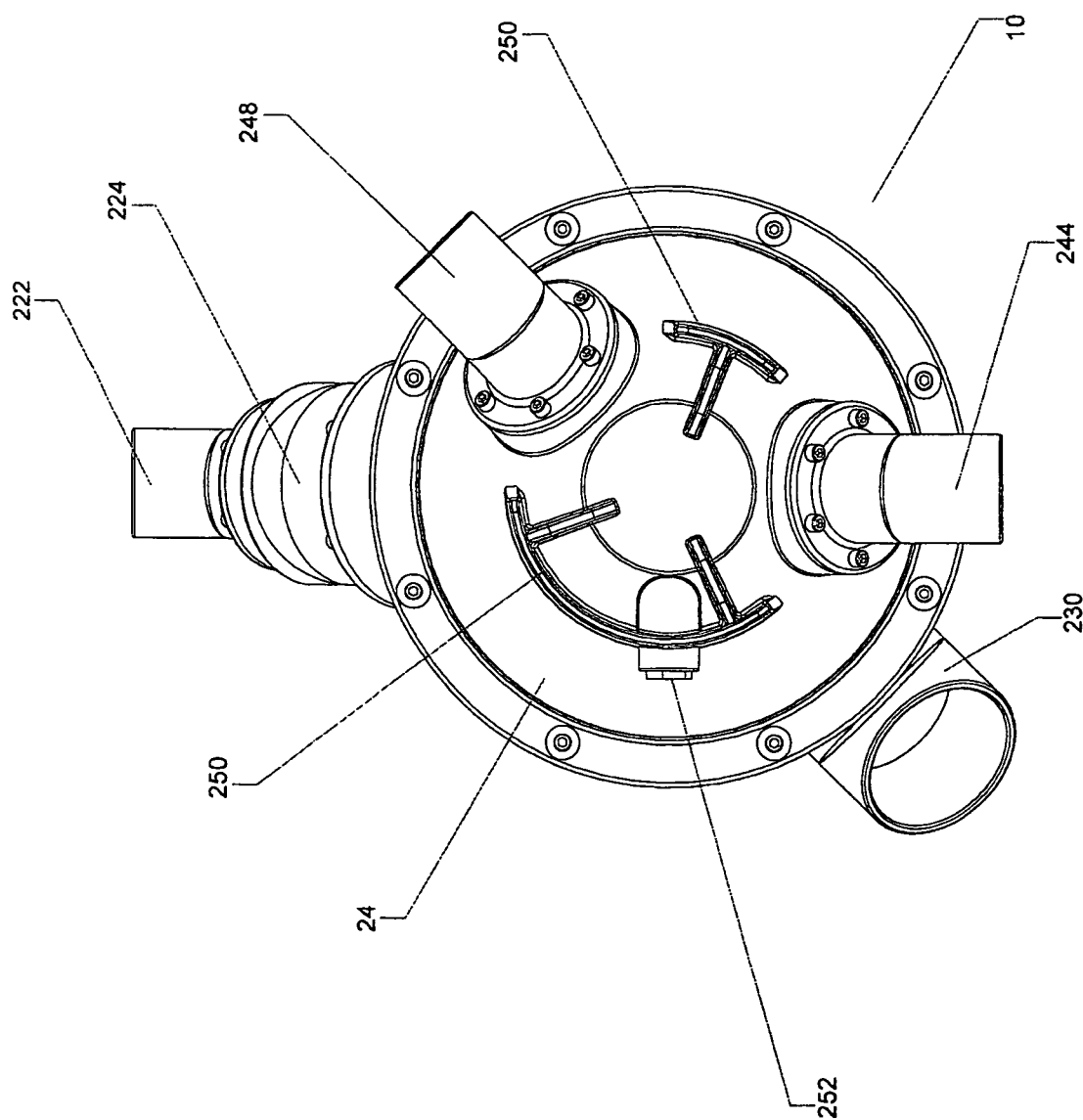

FIG. 8 is a bottom view of an embodiment of the instant inventive strainer device, depicting the filtered suction outlet fitting 244, backwash inlet fitting 248, backwash outlet fitting 230 and pre-strainer housing 224.

Figure 9A:
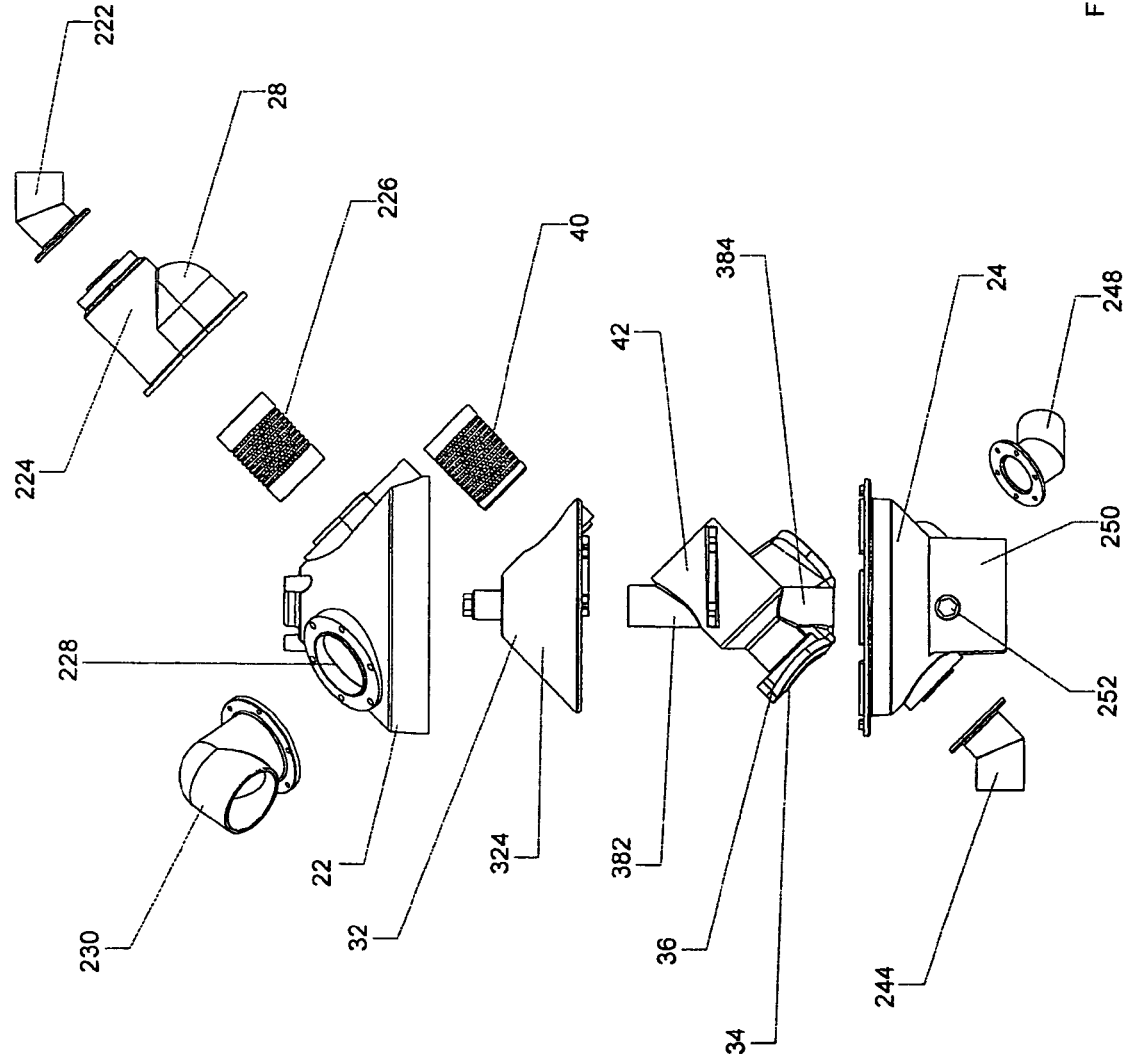

FIG. 9A is an exploded view of an embodiment of the instant inventive strainer device, depicting the elements of the strainer housing 20, and the elements of the trim assembly 30 in the straining position.

Figure 9B:
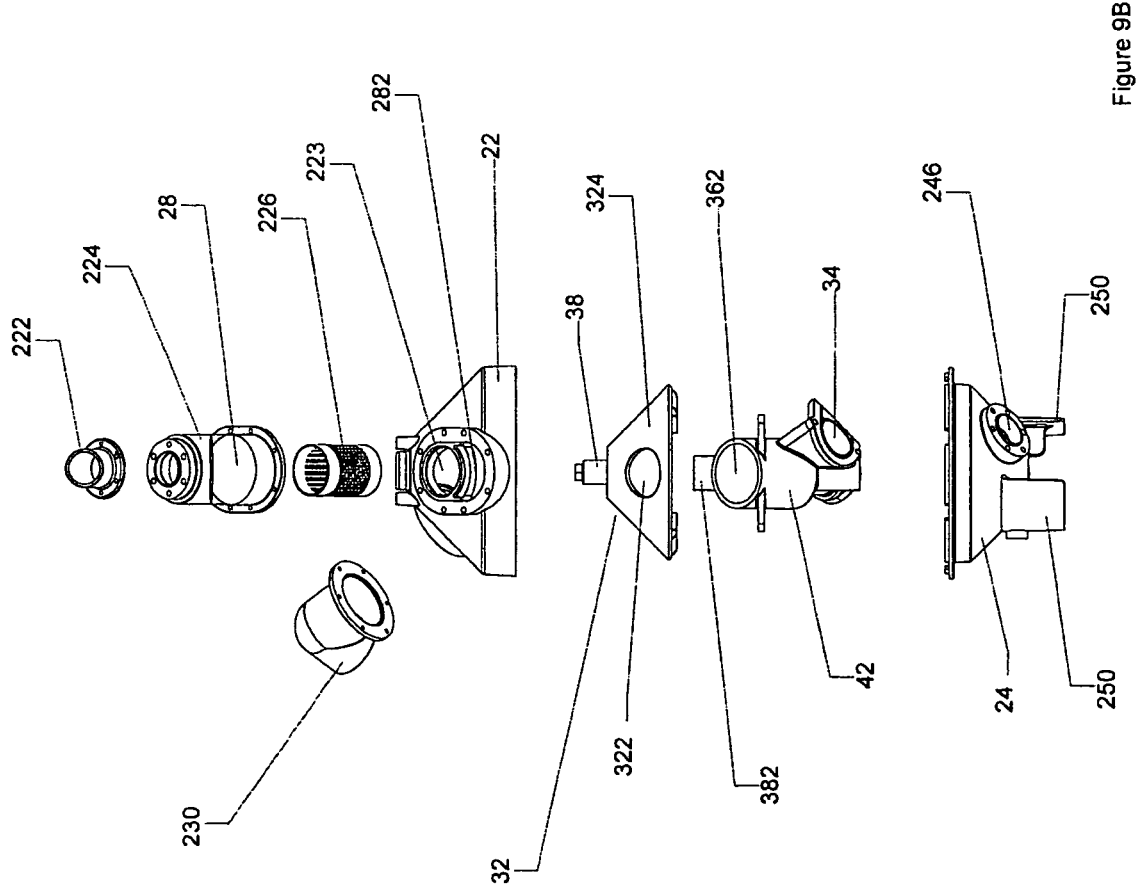

FIG. 9B is an exploded view of an embodiment of the instant inventive strainer device, depicting the upper strainer housing 22, lower strainer housing 24 and elements of the trim assembly 30 in a straining position.

FIG. 9C is an exploded view of an embodiment of the instant inventive strainer device, depicting the first strainer housing 22, second strainer housing 24 and elements of the trim assembly 30 in the backwashing position.

Figure 9D:
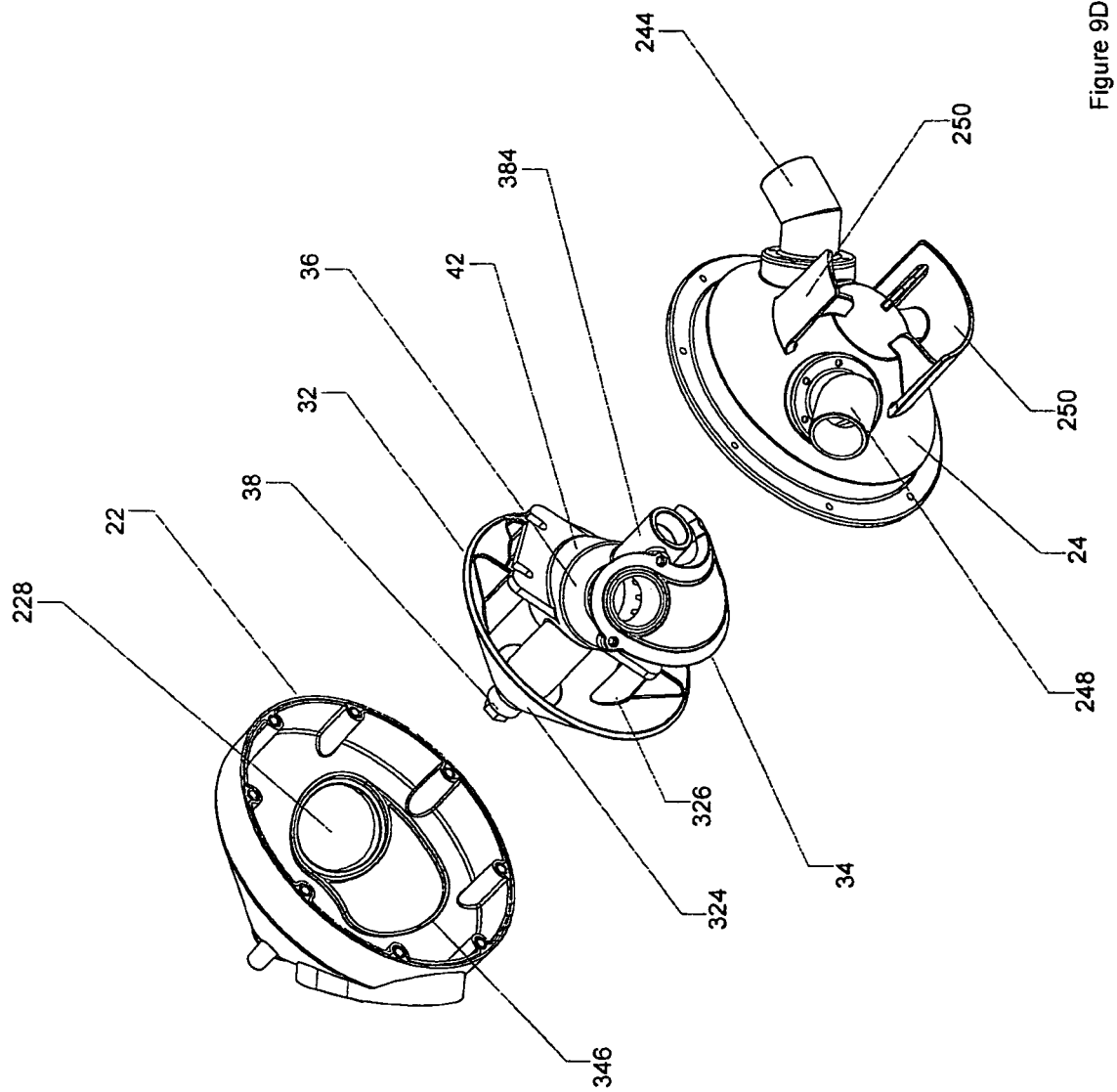

FIG. 9D is an exploded view of an embodiment of the instant inventive strainer device, depicting the first strainer housing 22, second strainer housing 24 and elements of the trim assembly 30 in the backwashing position.

Figure 10A:
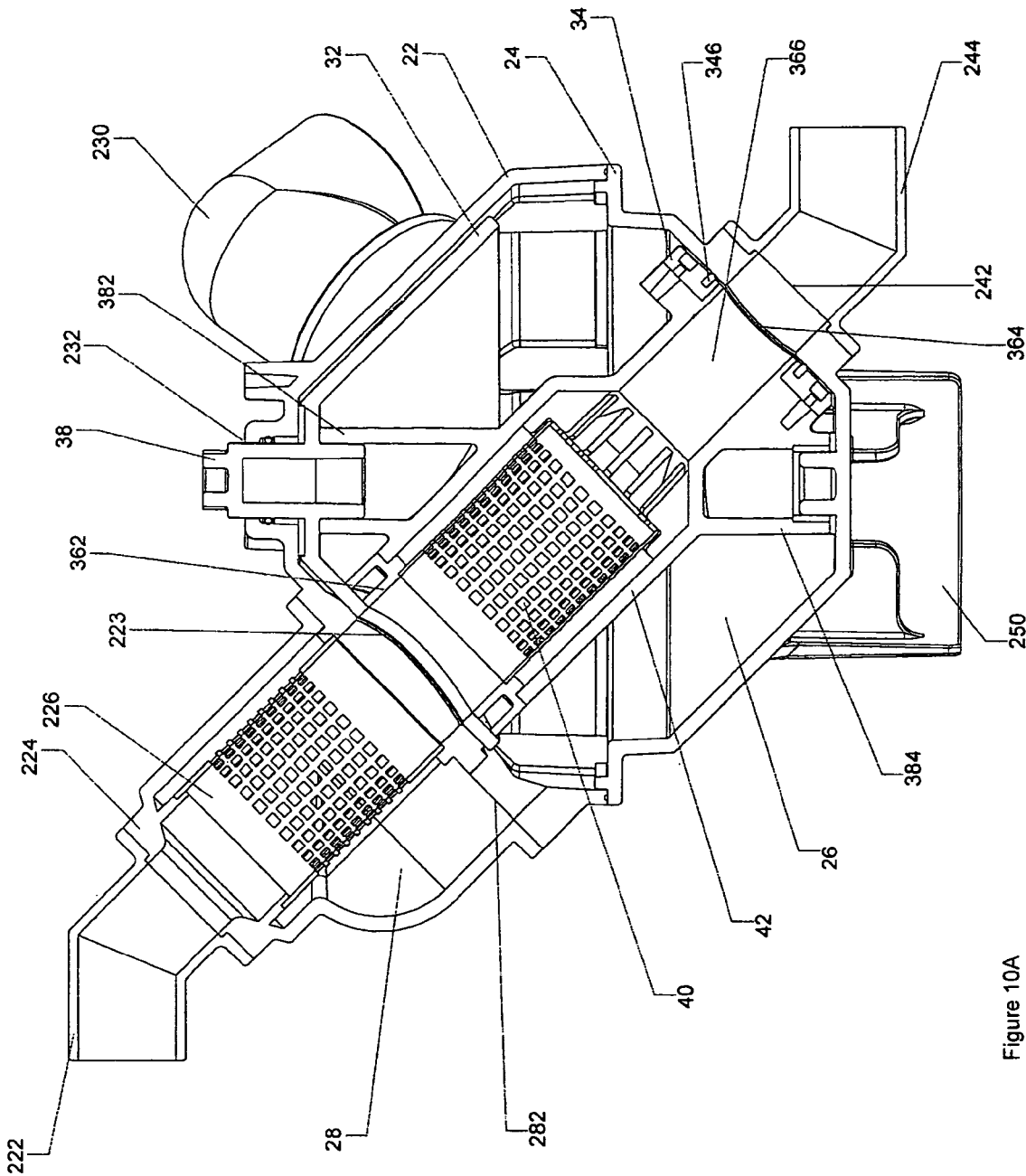

FIG. 10A is a cross sectional view of an embodiment of the instant inventive strainer device in the strainer position.

Figure 10B:
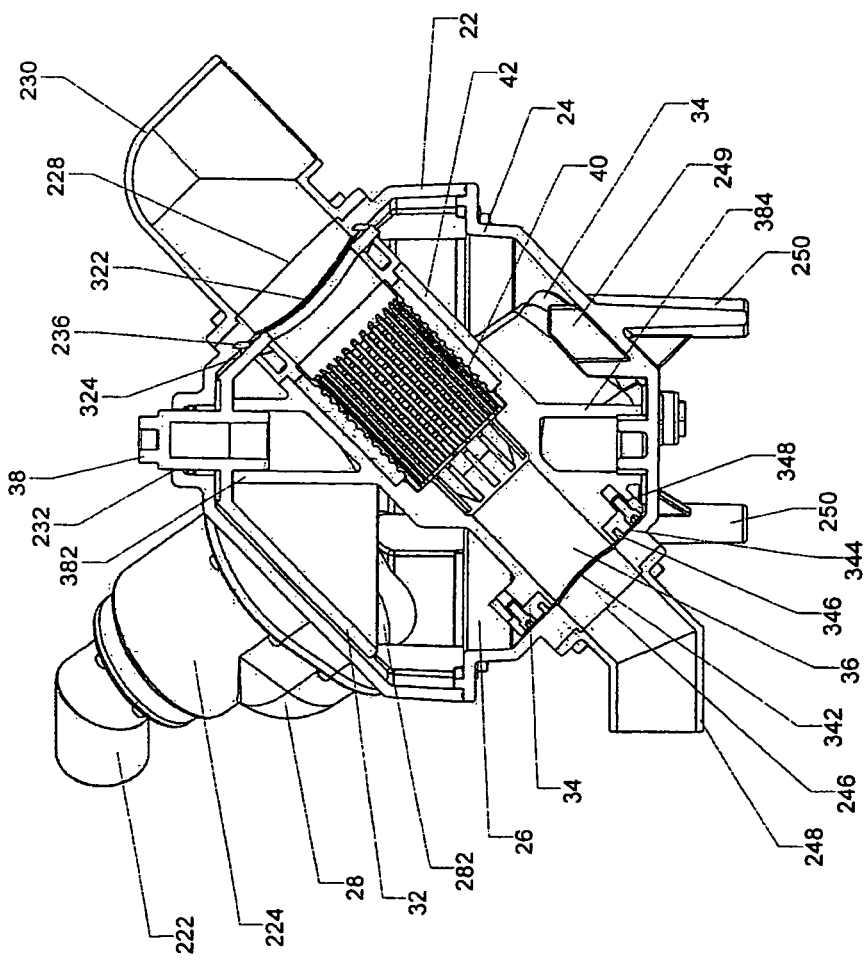

FIG. 10B is a cross sectional view of an embodiment of the instant inventive strainer device in the backwash position.

Figure 11A:
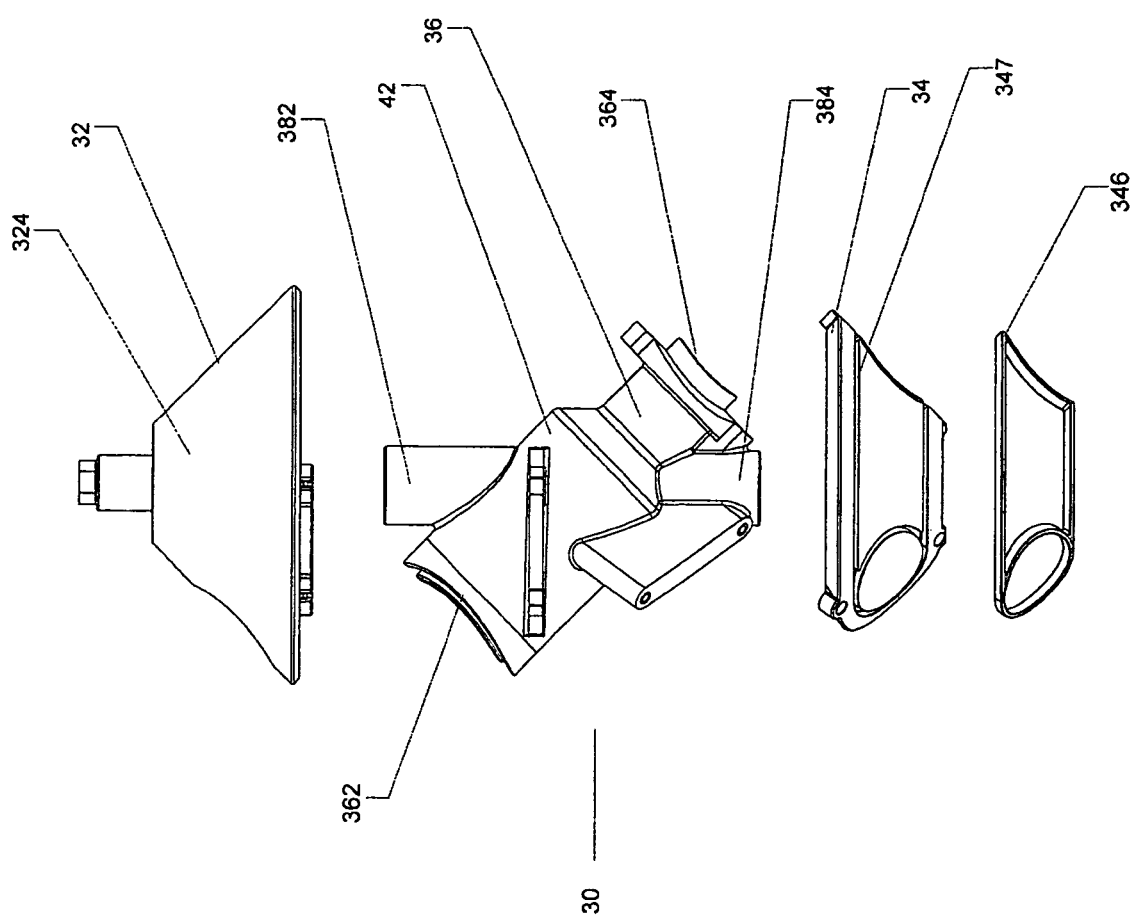

FIG. 11A is an exploded view of an embodiment of the instant inventive strainer device, depicting details of the trim assembly 30.

FIG. 11B is another exploded view of an embodiment of the instant inventive strainer device depicting details of the trim assembly 30.

Figure 12:
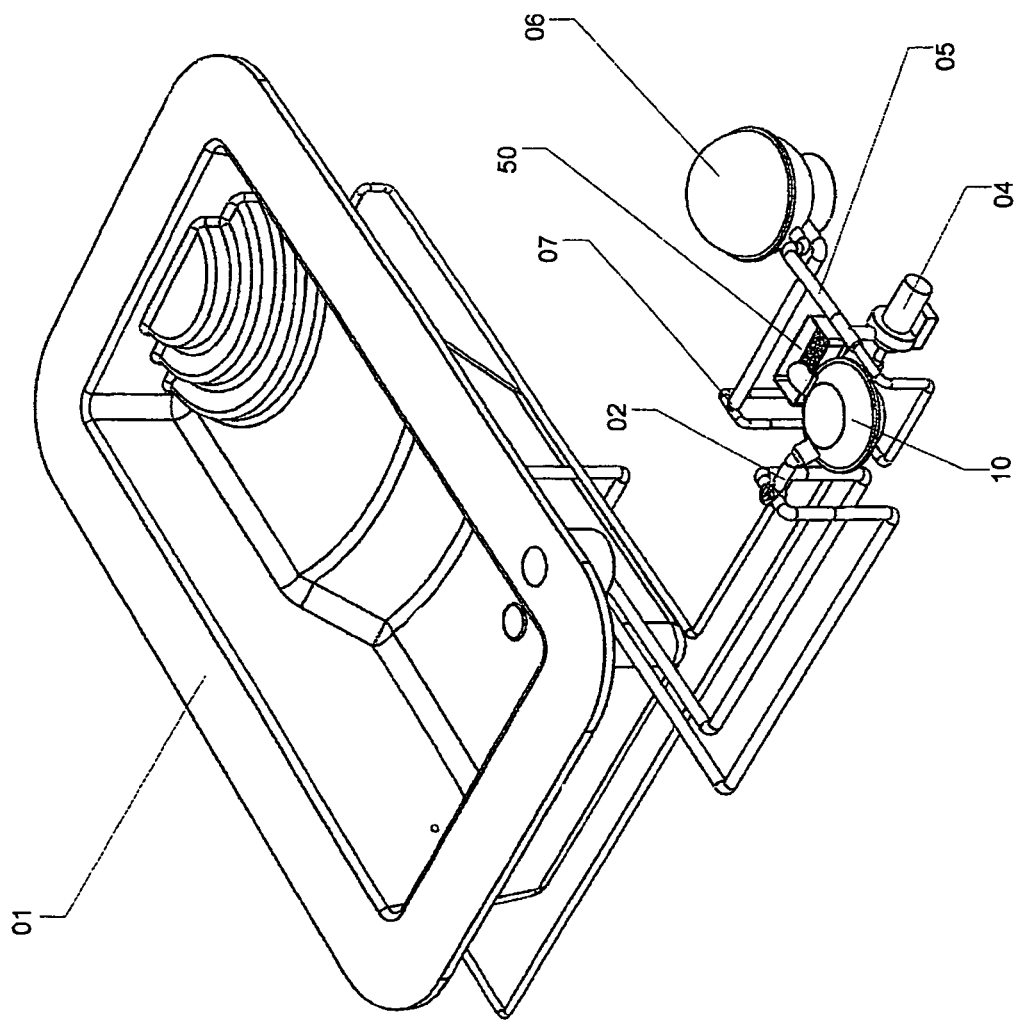

FIG. 12 depicts an isometric view of a pool circulation and filtering system including a second embodiment of the instant inventive strainer device 10.

Figure 13:
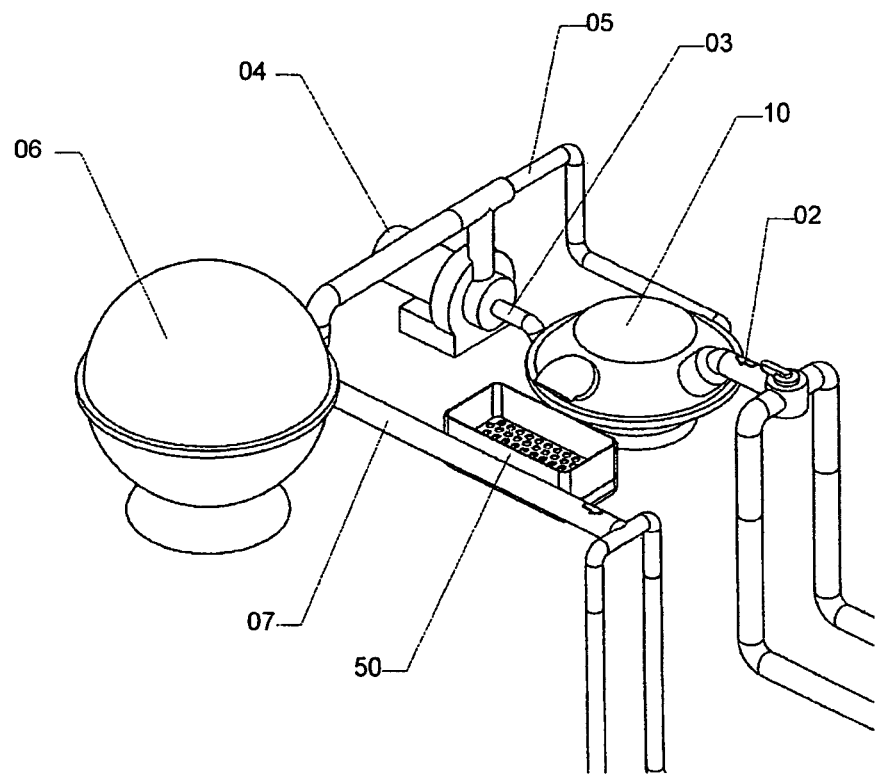

FIG. 13 depicts an isometric detailed view of a pool circulation filtering system including a second embodiment of the instant inventive strainer device 10.

Figure 14:
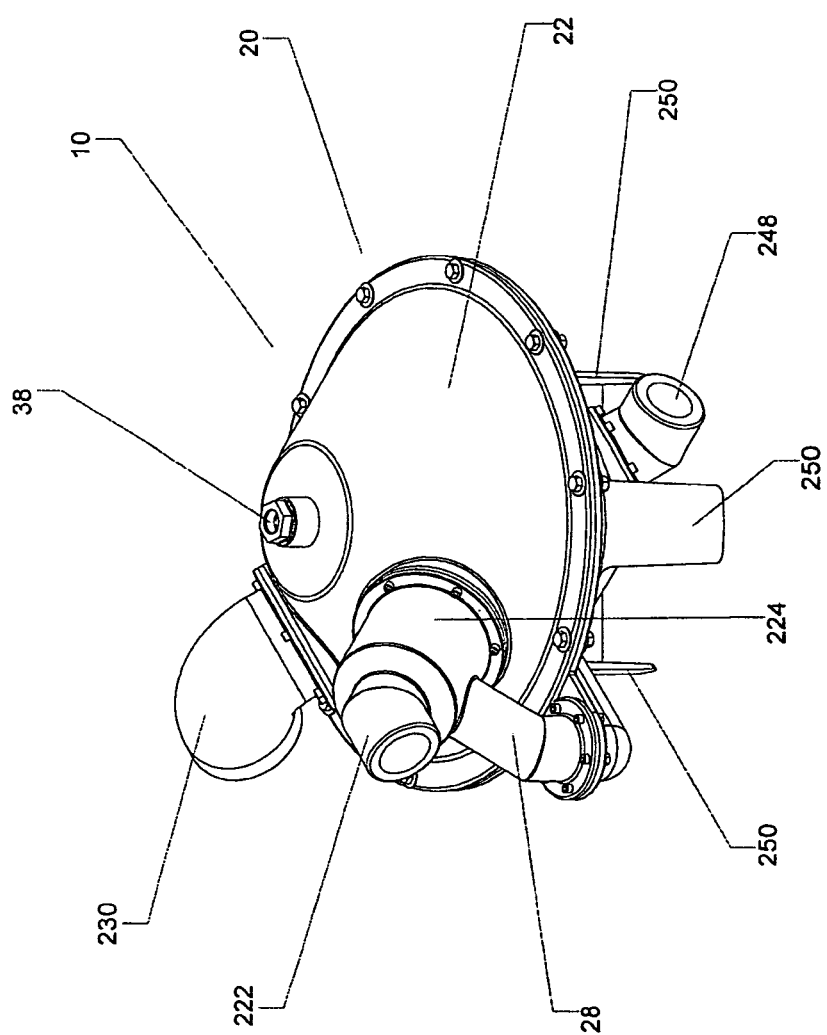

FIG. 14 is an isometric view of a second embodiment of the instant inventive strainer device 10 showing the exterior of the strainer housing 20 with the attached pre-strainer housing 224, backwash outlet fitting 230, backwash inlet fitting 248 and shunt 28.

Figure 15:
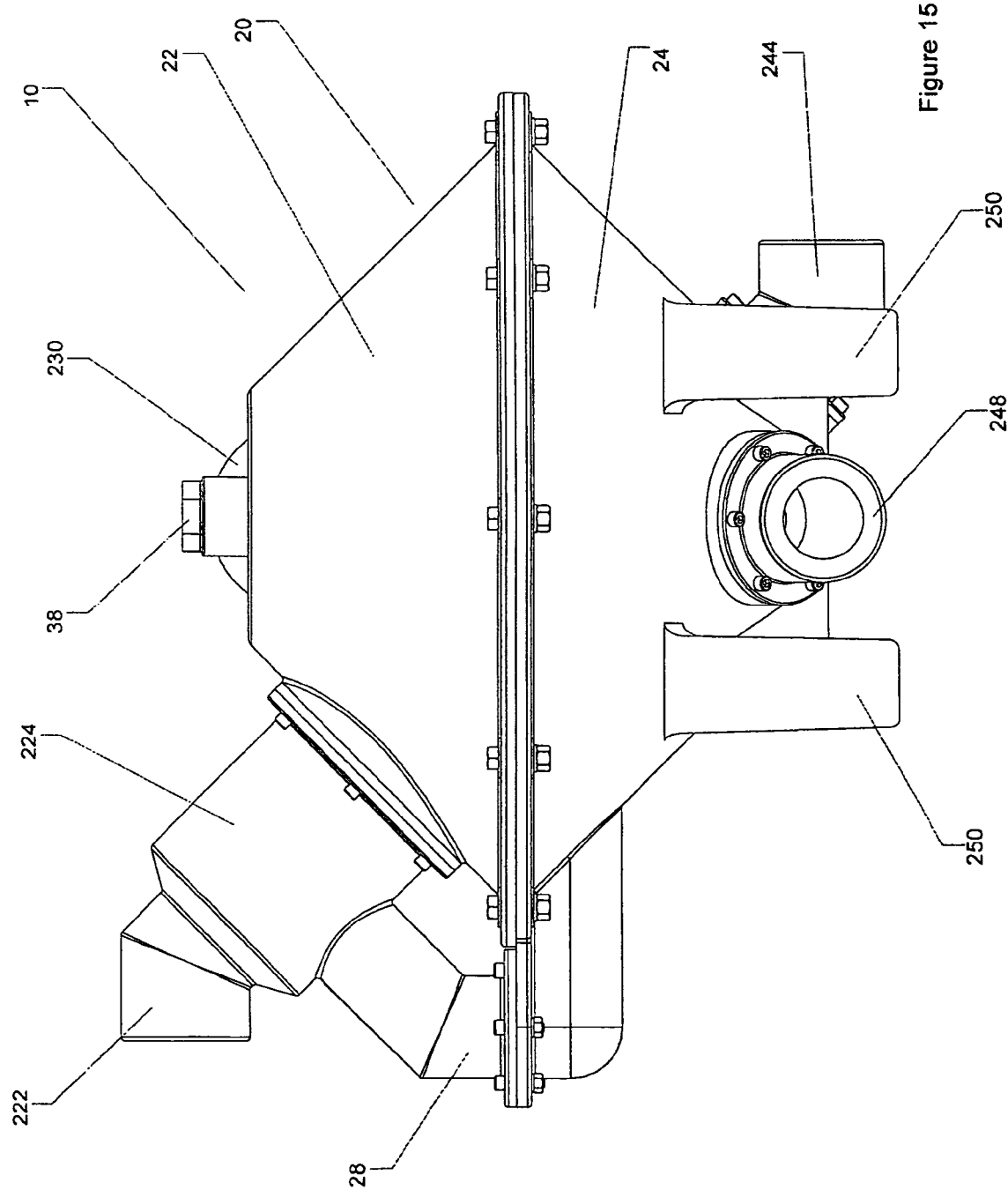

FIG. 15 is a plan view of a second embodiment of the instant inventive strainer device 10 showing the exterior of the strainer housing 20 with the attached pre-strainer housing 224, shunt 28, backwash inlet fitting 248, and filtered suction outlet fitting 244.

Figure 16:
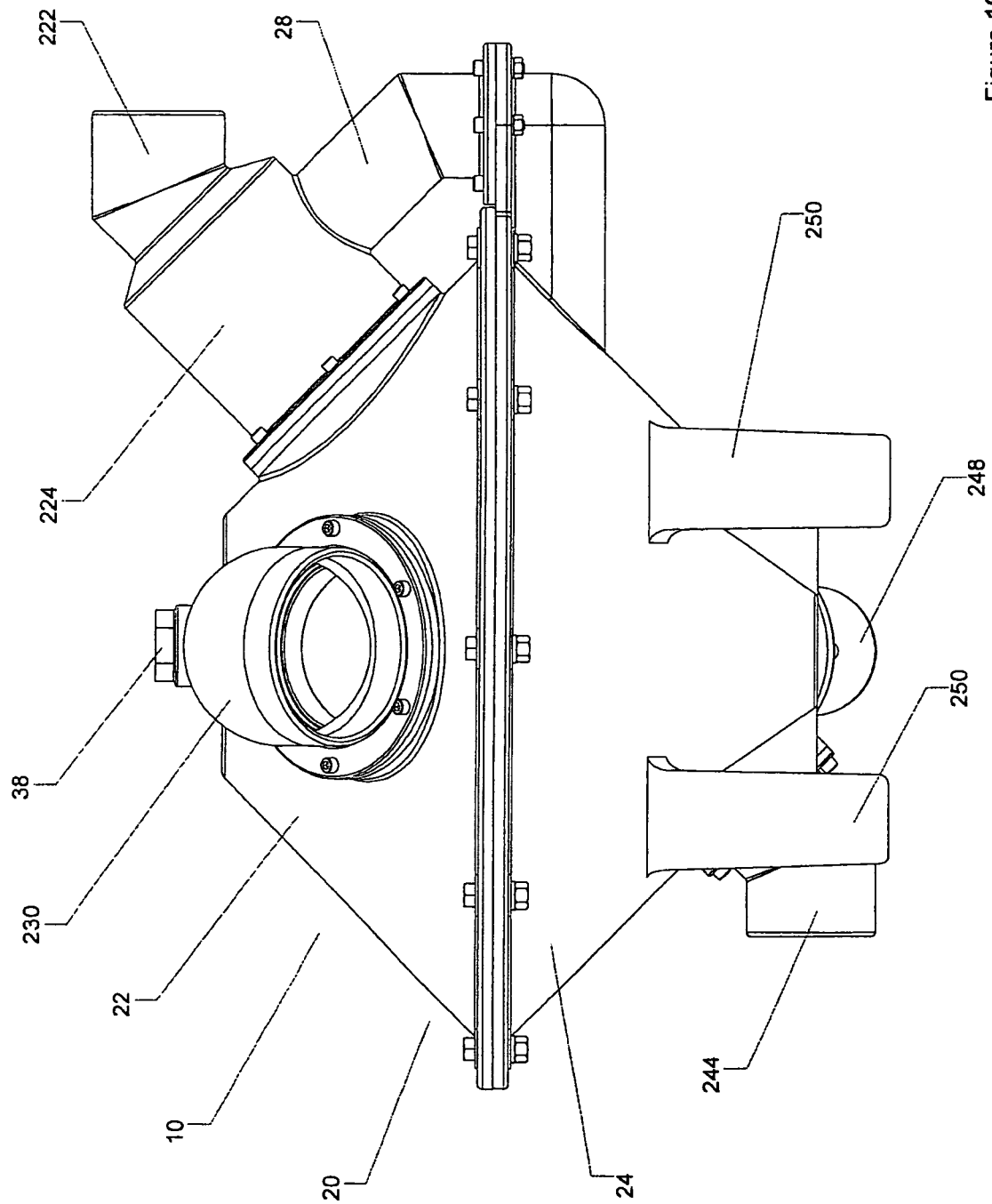

FIG. 16 is a plan view of a second embodiment of the instant inventive strainer device 10 showing the exterior of the strainer housing 20 with the attached pre-strainer housing 224, shunt 28, backwash outlet fitting 230, filtered suction outlet fitting 244 and backwash inlet fitting 248.

Figure 17:
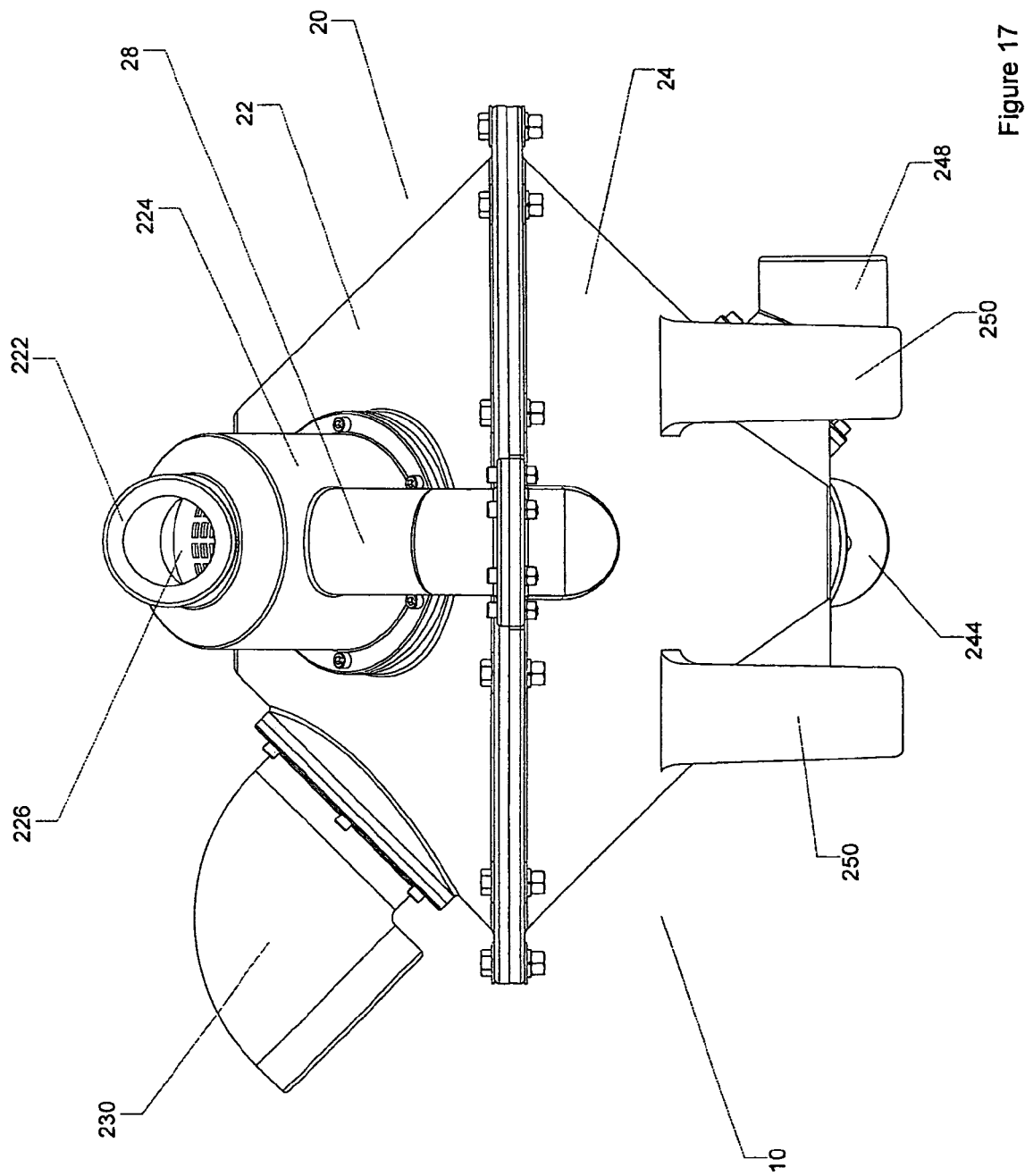

FIG. 17 is a plan view of a second embodiment of the instant inventive strainer device 10 showing the exterior of the strainer housing 20 with the attached pre-strainer housing 224, shunt 28, backwash outlet fitting 230, filtered suction outlet fitting 244 and backwash inlet fitting 248.

Figure 18:
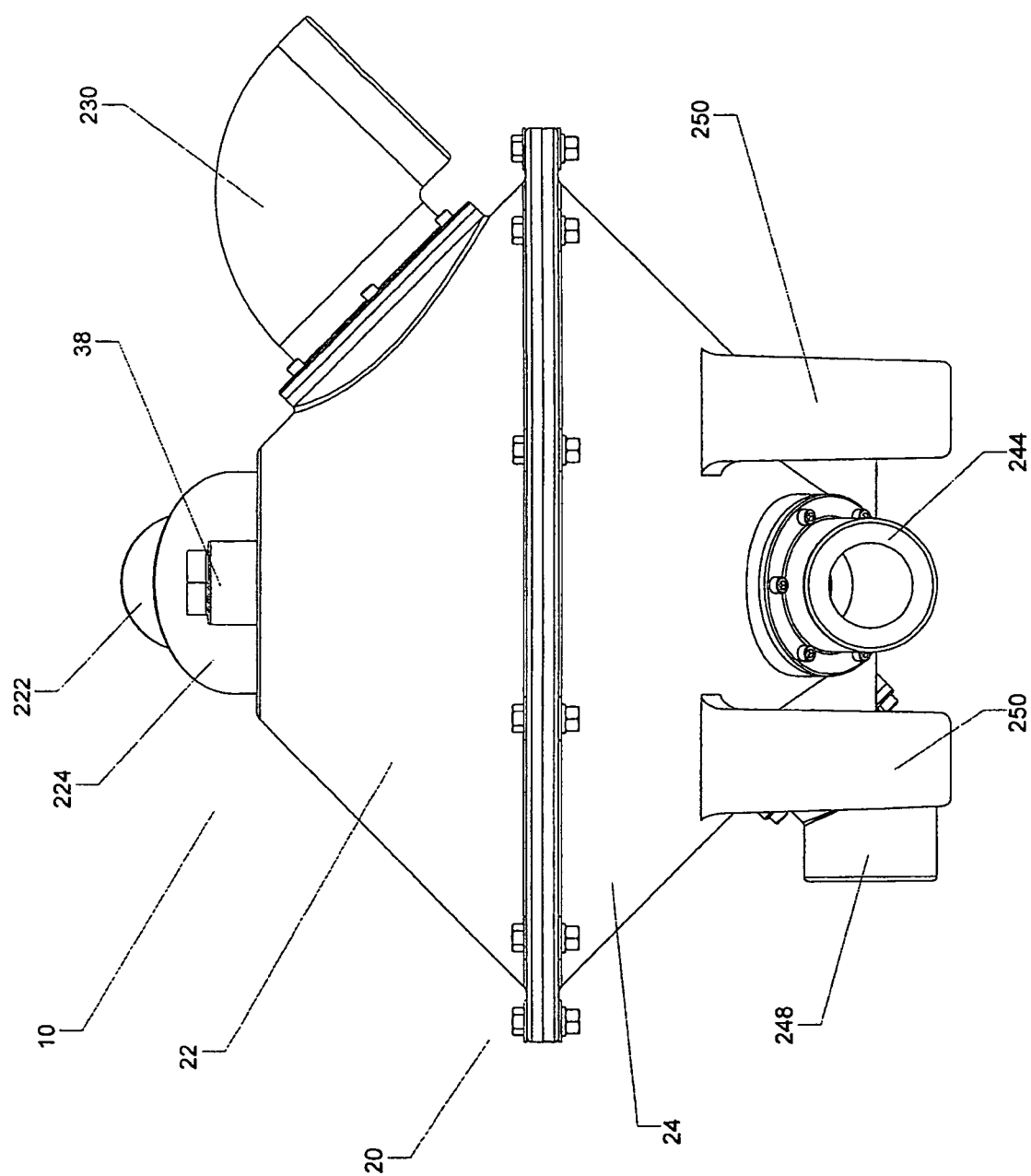

FIG. 18 is a plan view of a second embodiment of the instant inventive strainer device 10 showing the exterior of the strainer housing 20 with the attached pre-strainer housing 224, backwash outlet fitting 230, filtered suction outlet fitting 244 and backwash inlet fitting 248.

Figure 19:
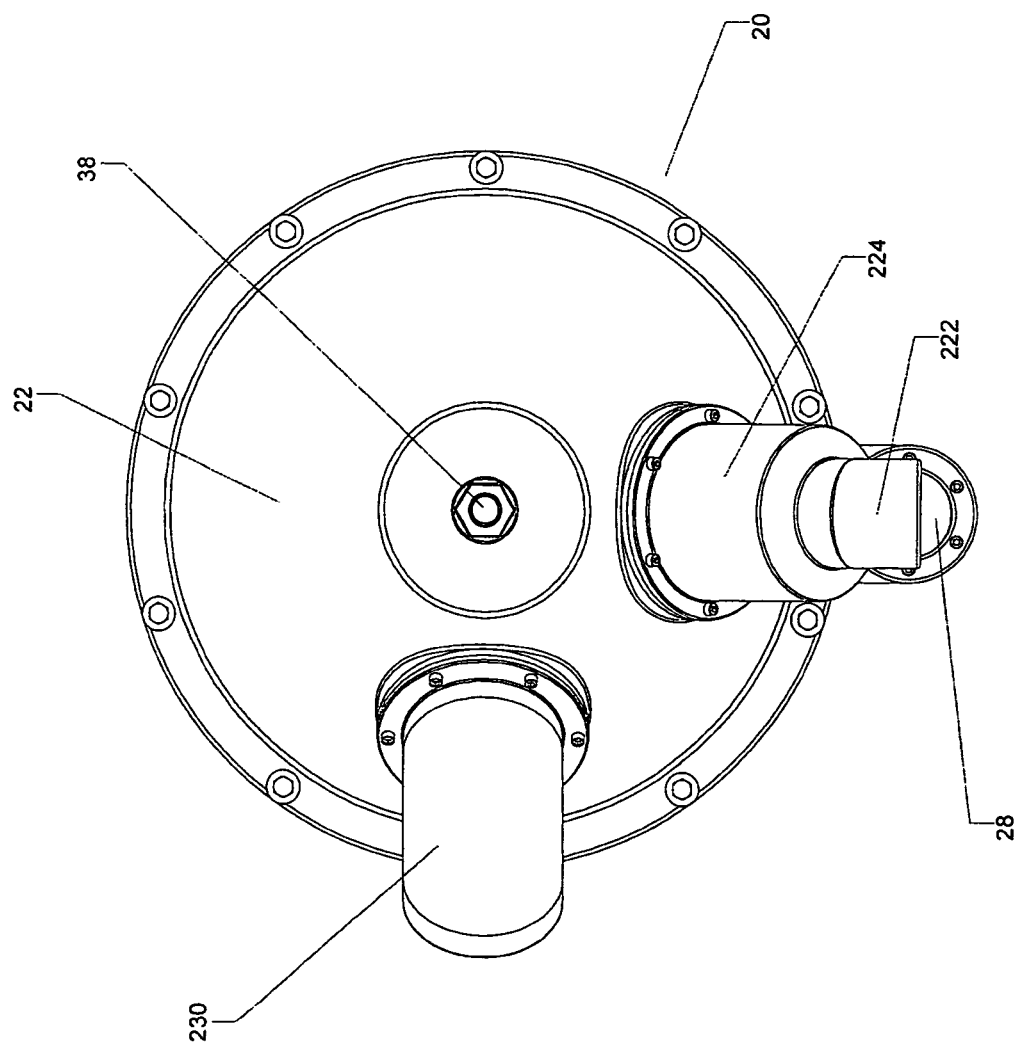

FIG. 19 is top view of a second embodiment of the instant inventive strainer device 10 showing the exterior of the strainer housing 20 with the attached pre-strainer housing 224 and backwash outlet fitting 230.

Figure 20:
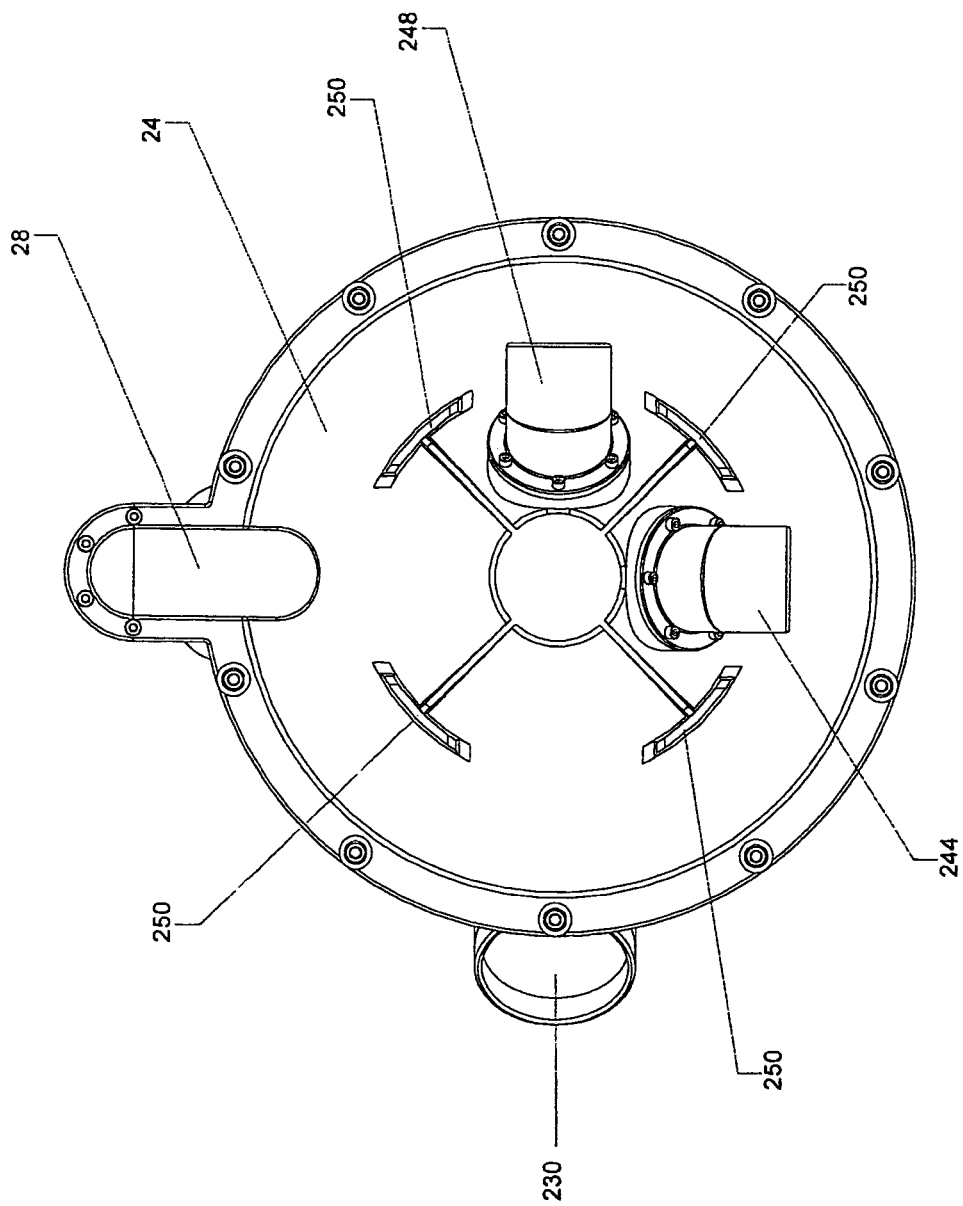

FIG. 20 is a bottom view of a second embodiment of the instant inventive strainer device 10 showing the exterior of the strainer housing 20 with the attached shunt 28, backwash outlet fitting 230, filtered suction outlet fitting 244 and backwash inlet fitting 248.

Figure 21A:
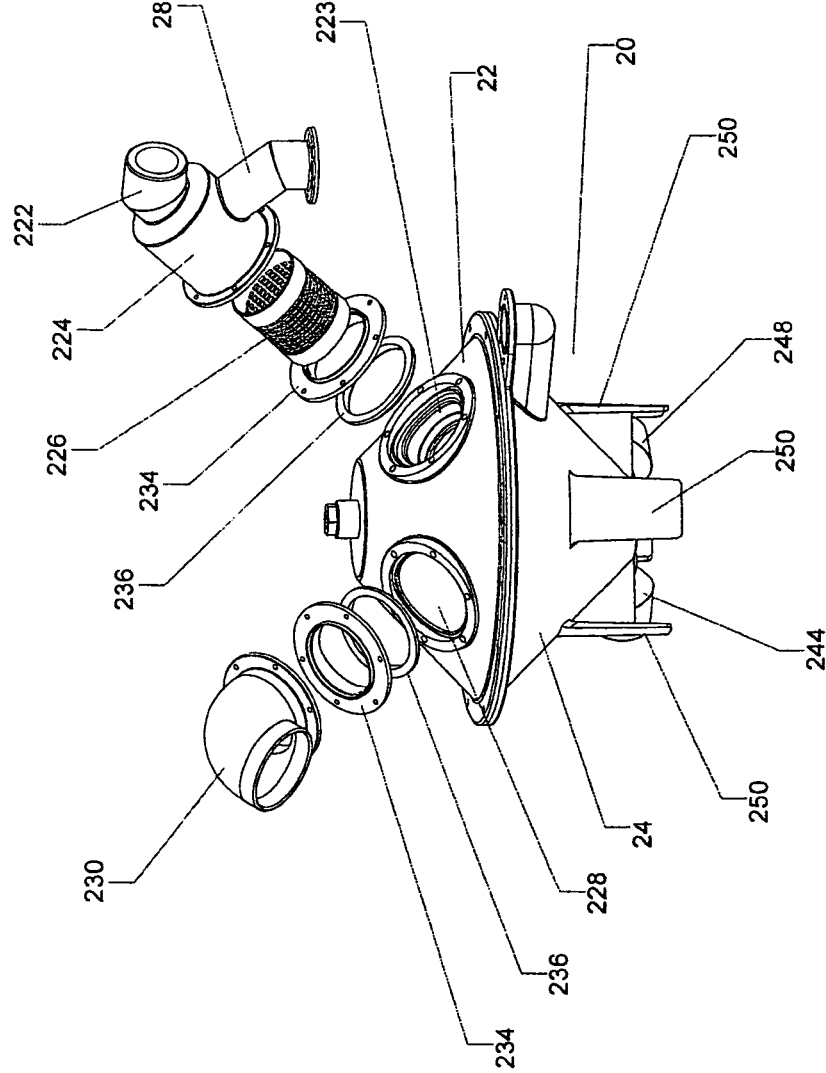

FIG. 21A is an exploded isometric view of a second embodiment of the instant inventive strainer device 10 showing the elements of the housing 20 and shunt 28.

Figure 21B:
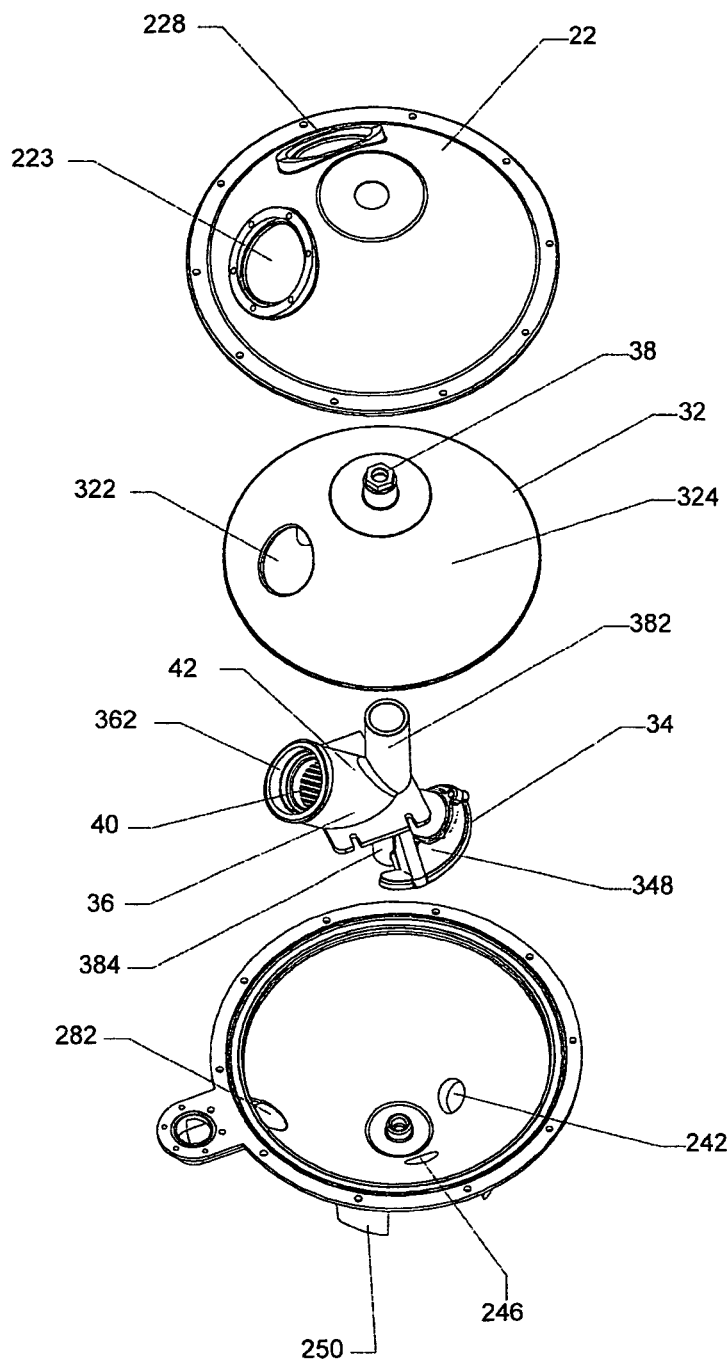

FIG. 21B is an exploded isometric view of a second embodiment of the instant inventive strainer device 10 showing the elements of a trim assembly 30 and housing 20.

Figure 21C:
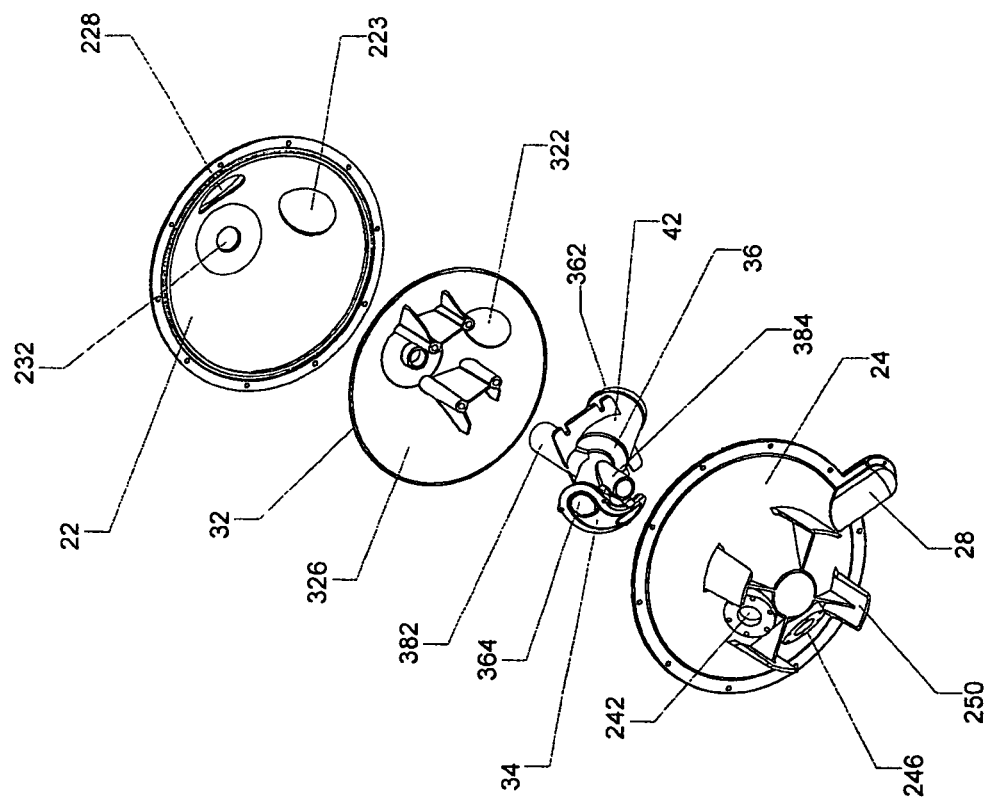

FIG. 21C is an exploded isometric view of a second embodiment of the instant inventive strainer device 10 showing the elements of a trim assembly 30 and housing 20.

Figure 22:
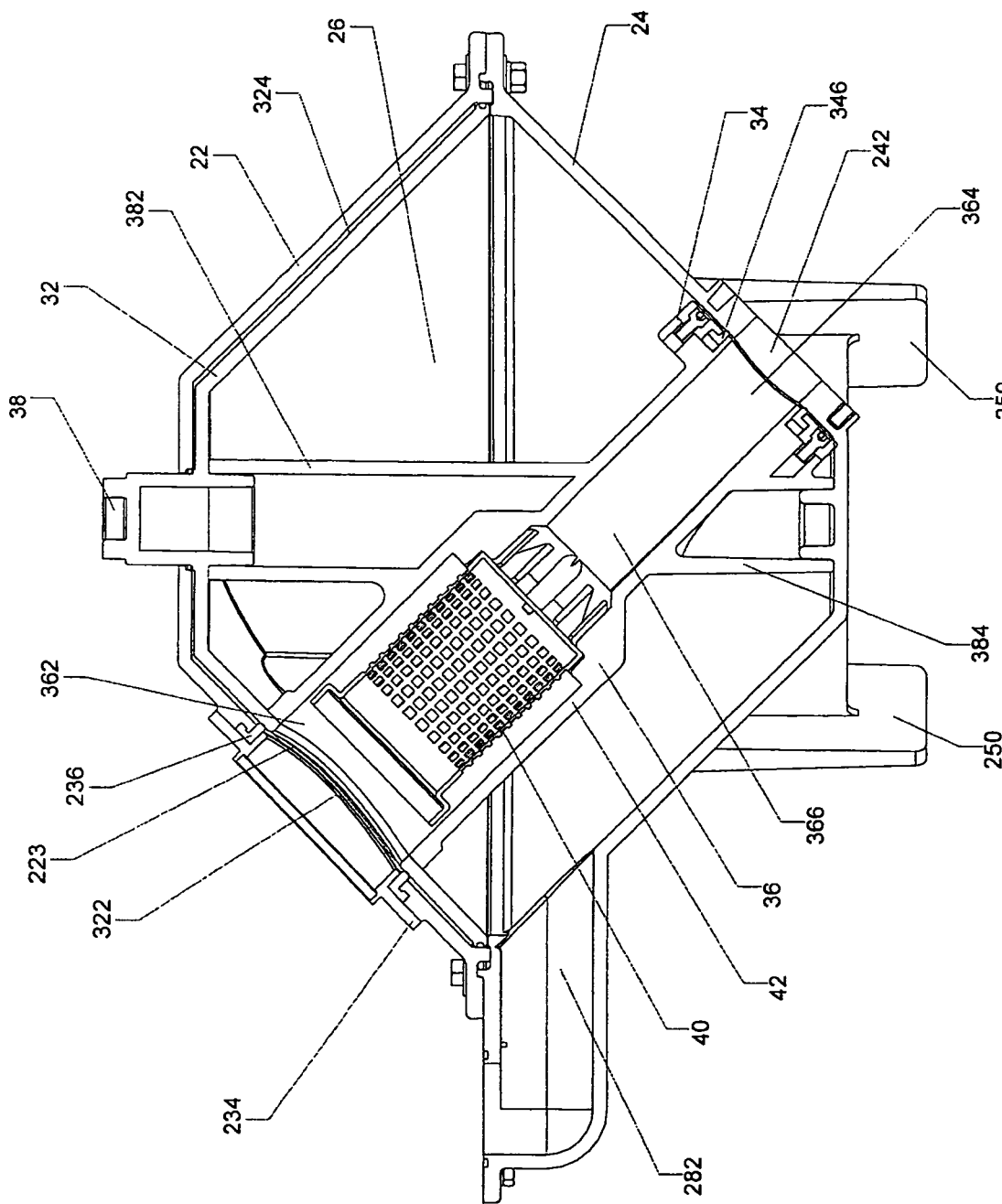

FIG. 22 is a cross section view of a second embodiment of the instant inventive strainer device 10 showing the trim assembly 30 in a straining position.

Figure 23A:
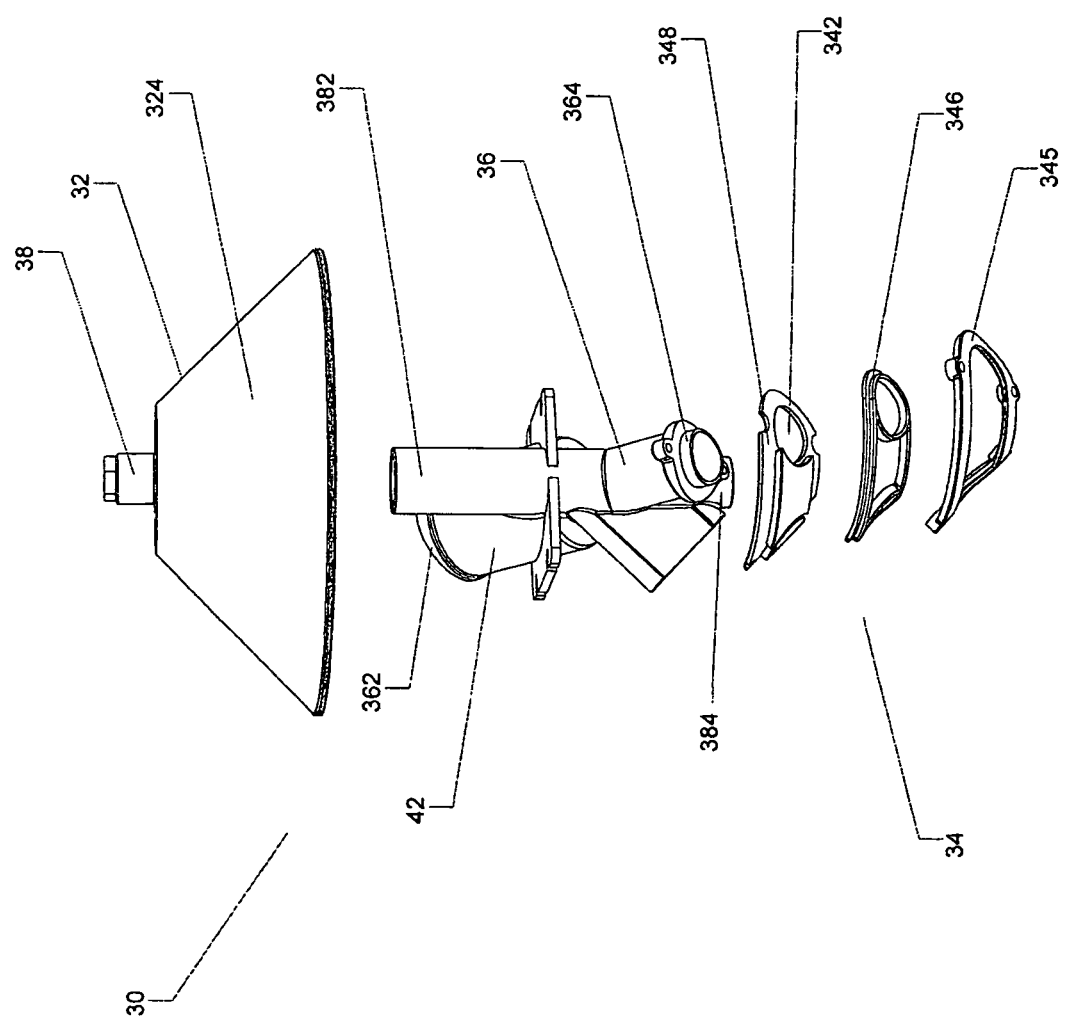

FIG. 23A is an exploded detailed view of a second embodiment of the instant inventive strainer device 10 showing the details of the trim assembly 30.

Figure 23B:
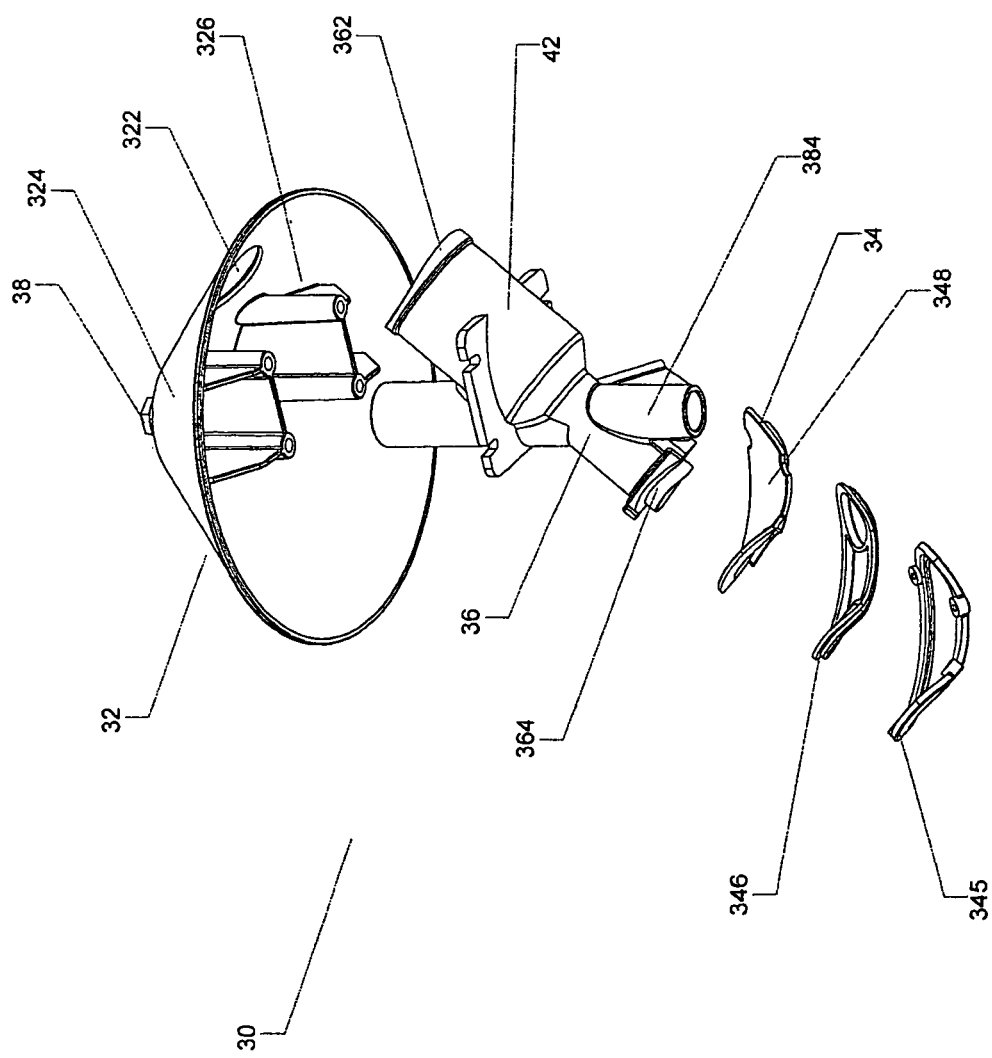

FIG. 23B is an exploded detailed view of a second embodiment of the instant inventive strainer device 10 showing the details of the trim assembly 30.

Figure 24:
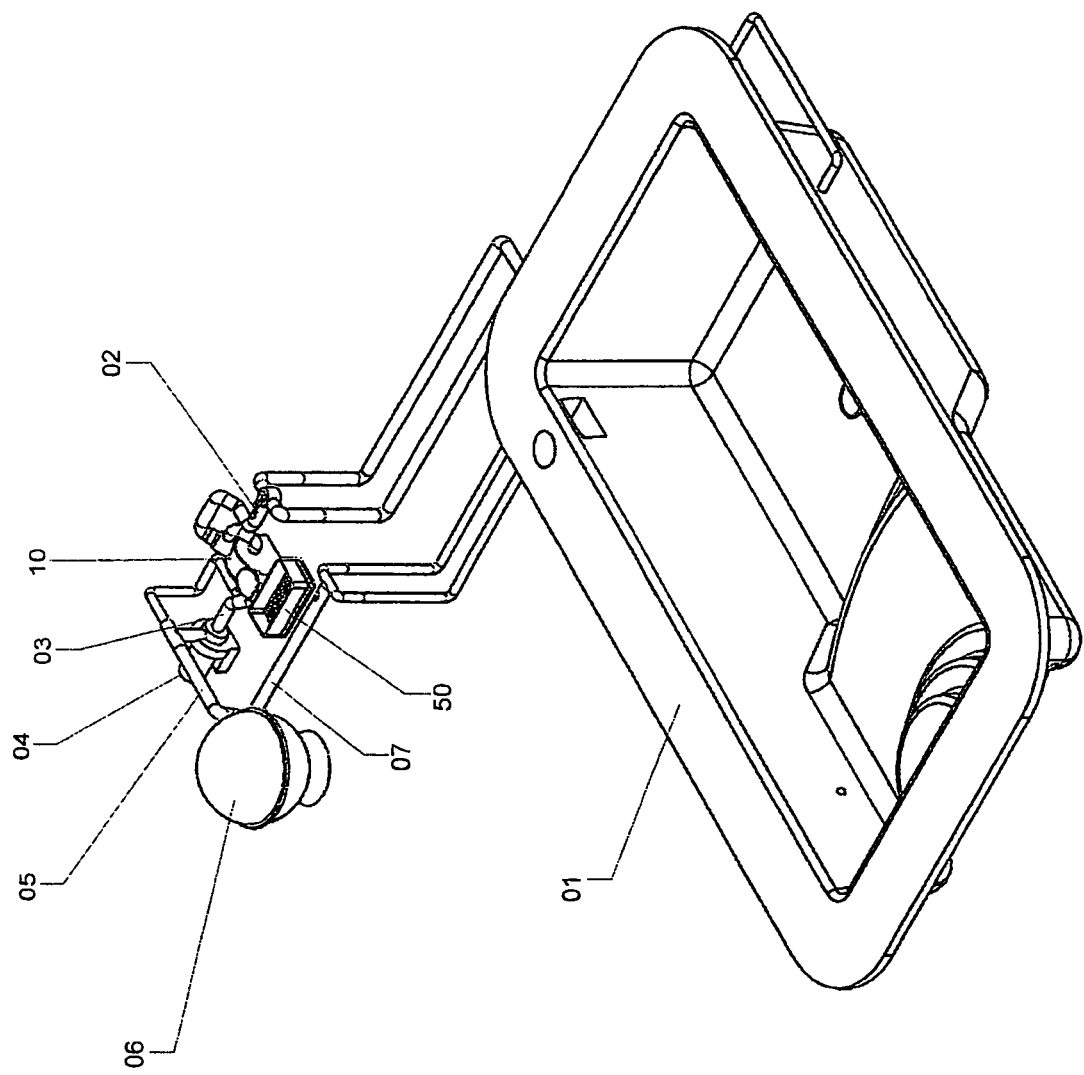

FIG. 24 is an isometric view of a pool circulation and filtering system including a third embodiment of the instant inventive strainer device 10.

Figure 25:
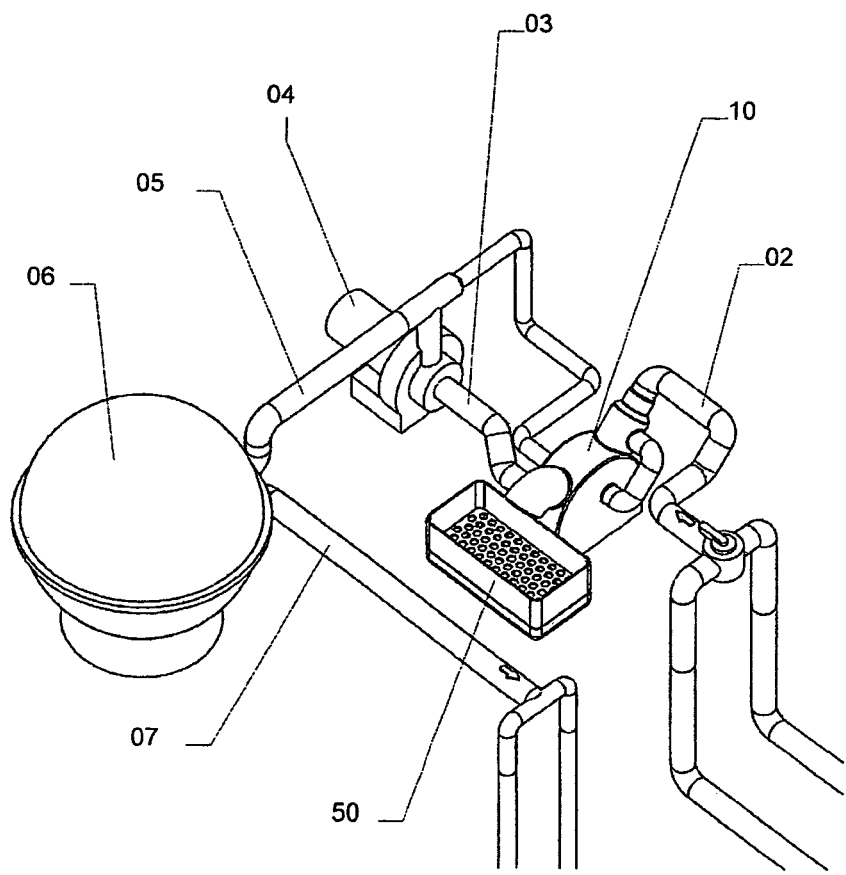

FIG. 25 depicts an isometric detailed view of a pool circulation filtering system including a third embodiment of the instant inventive strainer device 10.

Figure 26:
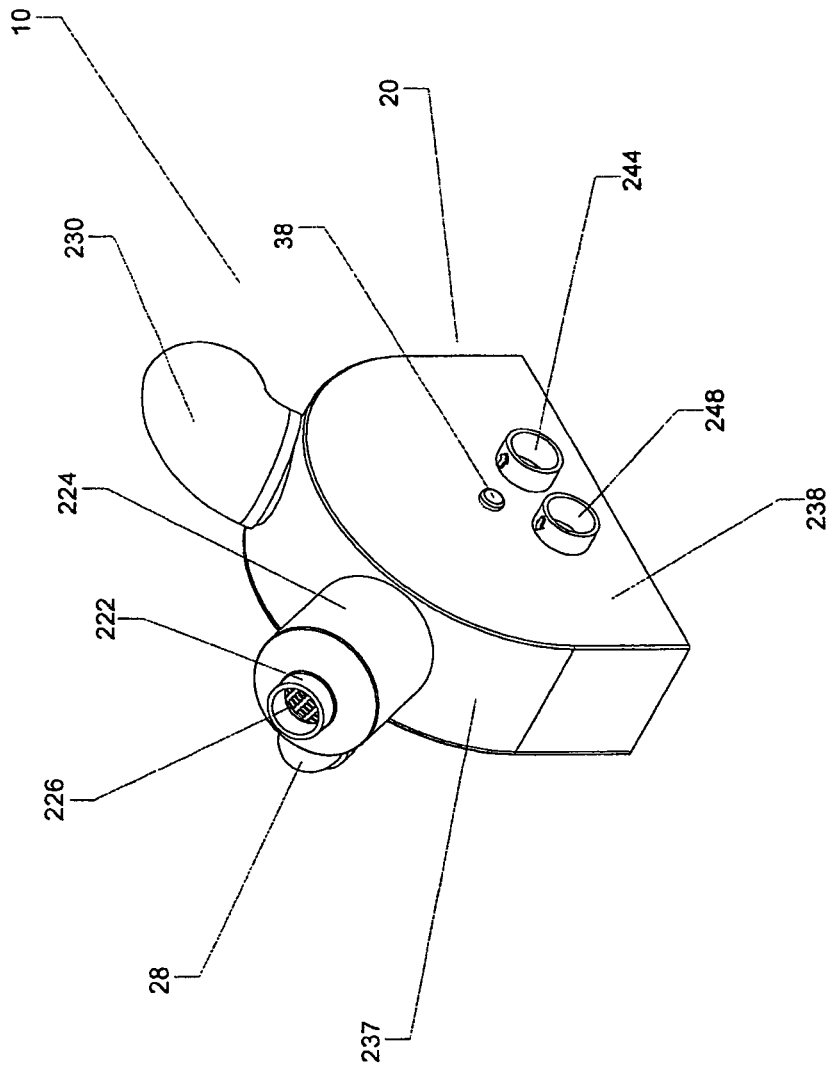

FIG. 26 is an isometric view of a third embodiment of the instant inventive strainer device 10 showing the exterior of the strainer housing 20 with the attached pre-strainer housing 224, backwash outlet fitting 230, filtered suction outlet fitting 244, and shunt 28.

Figure 27:
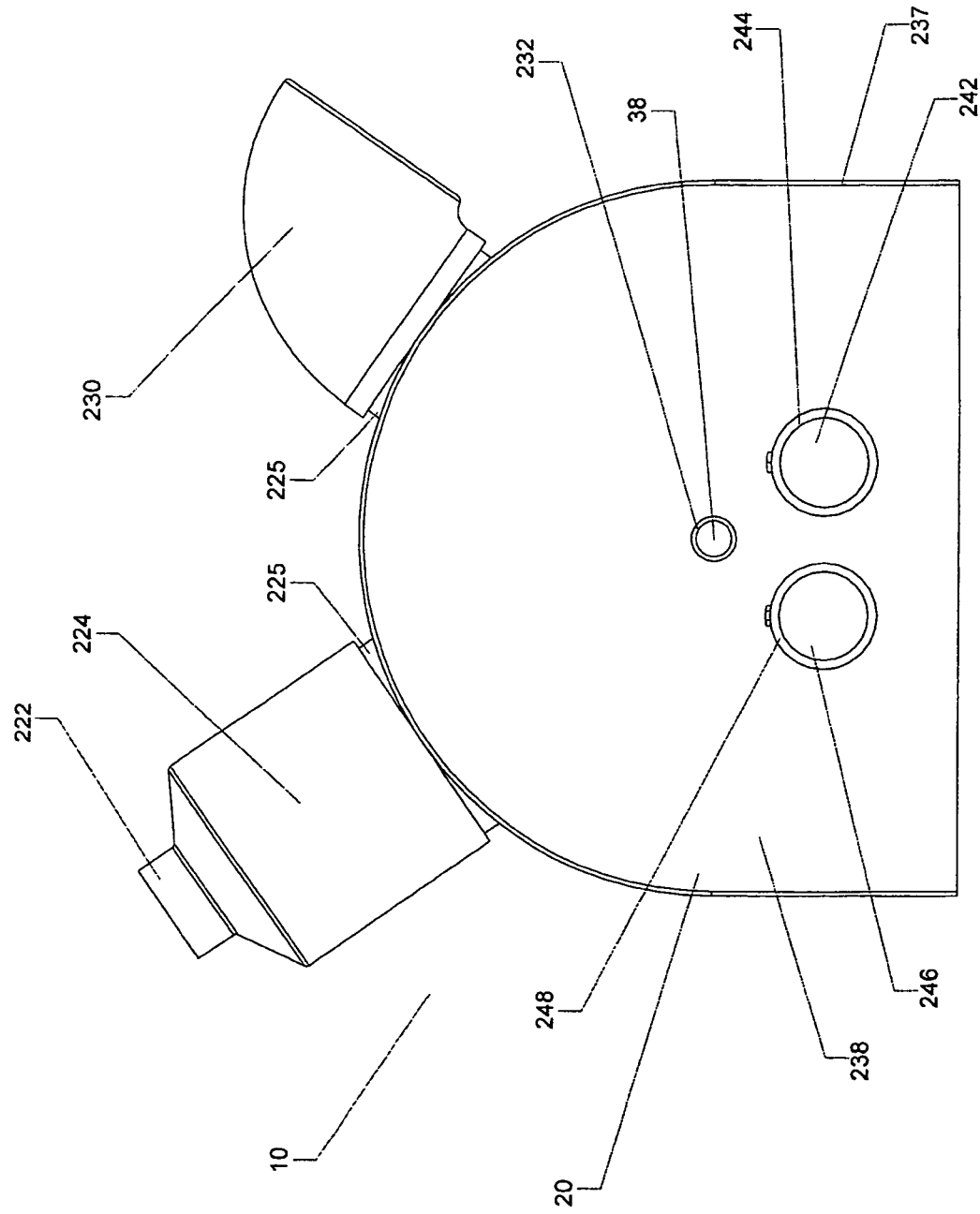

FIG. 27 is plan view of a third embodiment of the instant inventive strainer device 10 showing the exterior of the strainer housing 20 with the attached pre-strainer housing 224, backwash outlet fitting 230, backwash inlet fitting 248 and filtered suction outlet fitting 244.

Figure 28:
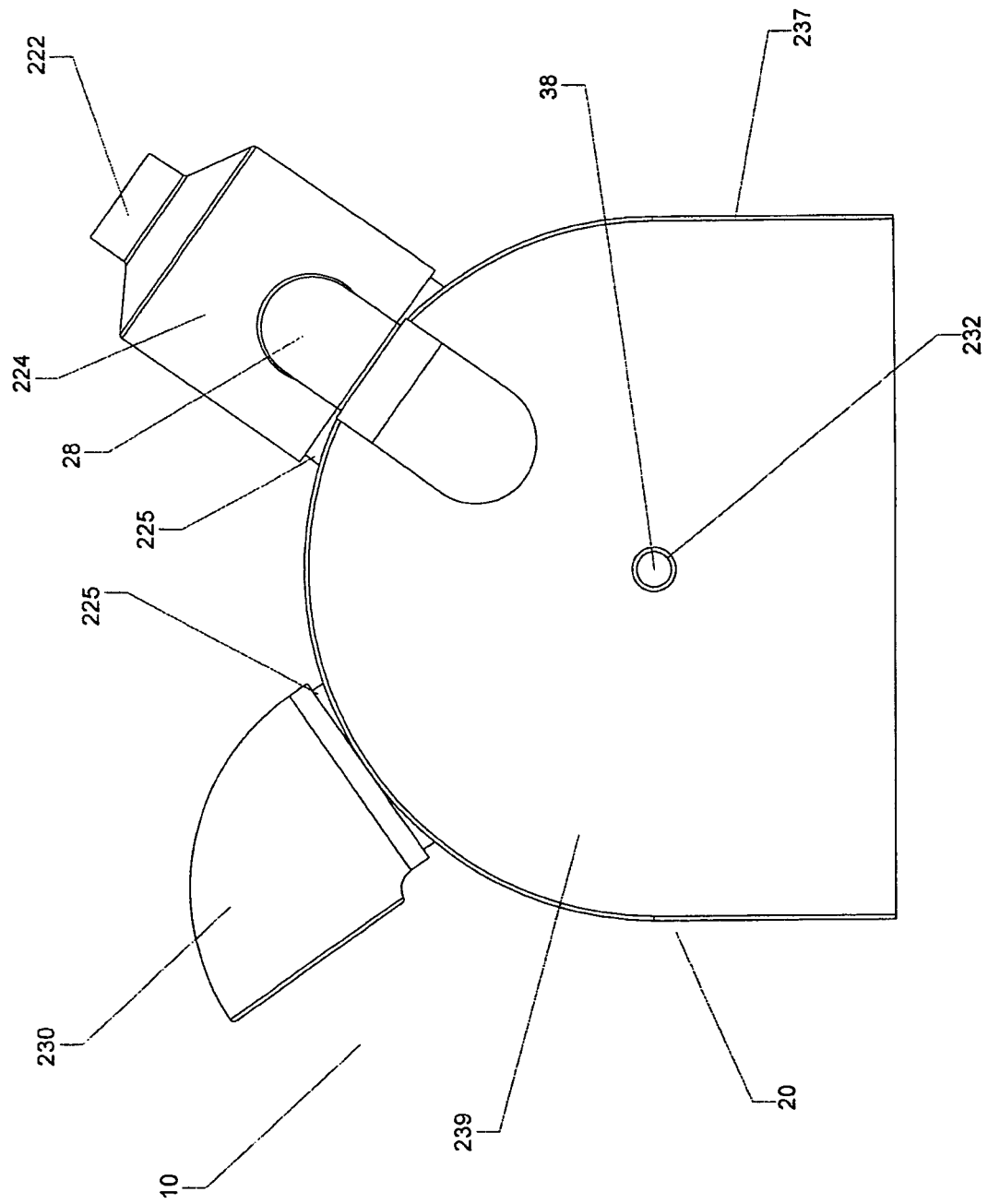

FIG. 28 is a plan view of a third embodiment of the instant inventive strainer device 10 showing the exterior of the strainer housing 20 with the attached pre-strainer housing 224, backwash outlet fitting 230, and shunt 28.

Figure 29:
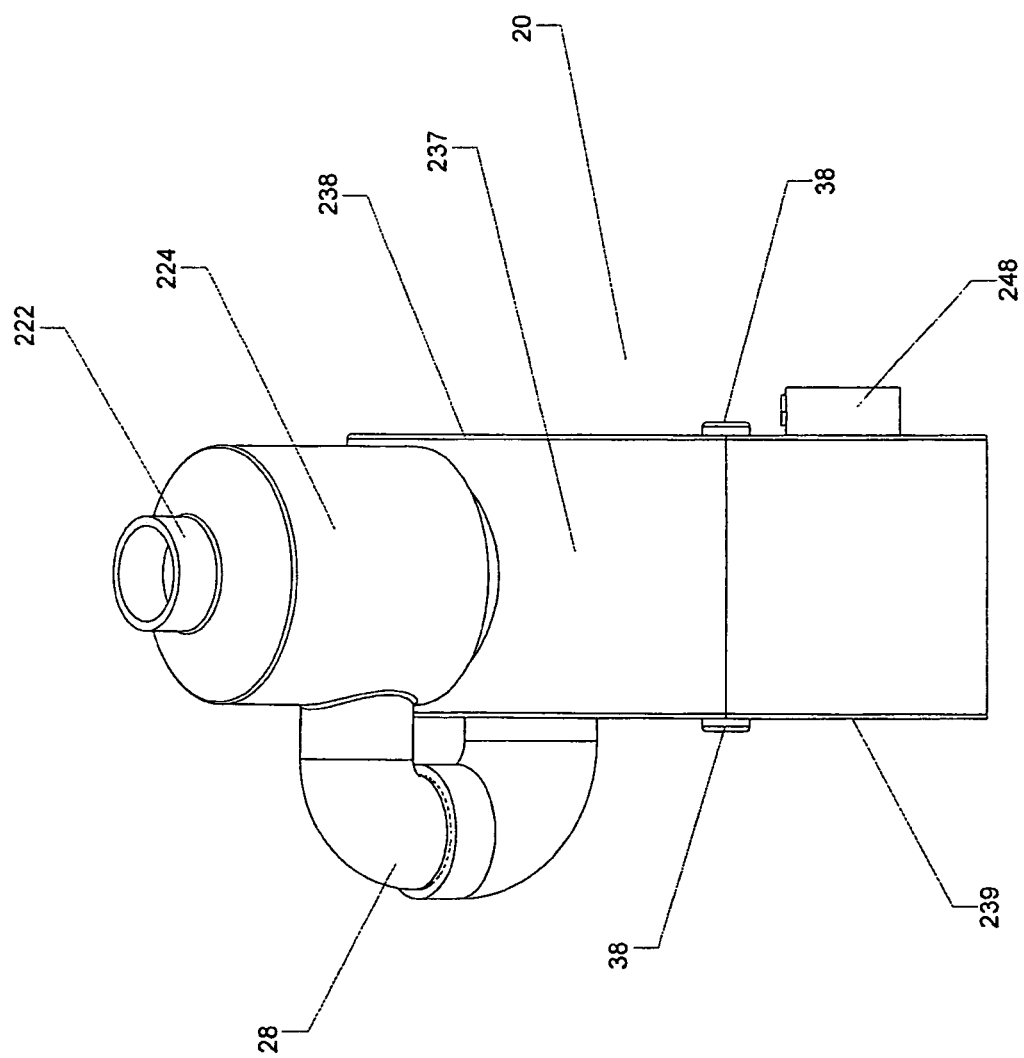

FIG. 29 is a plan view of a third embodiment of the instant inventive strainer device 10 showing the exterior of the strainer housing 20 with the attached pre-strainer housing 224, backwash inlet fitting 248, and shunt 28.

Figure 30:
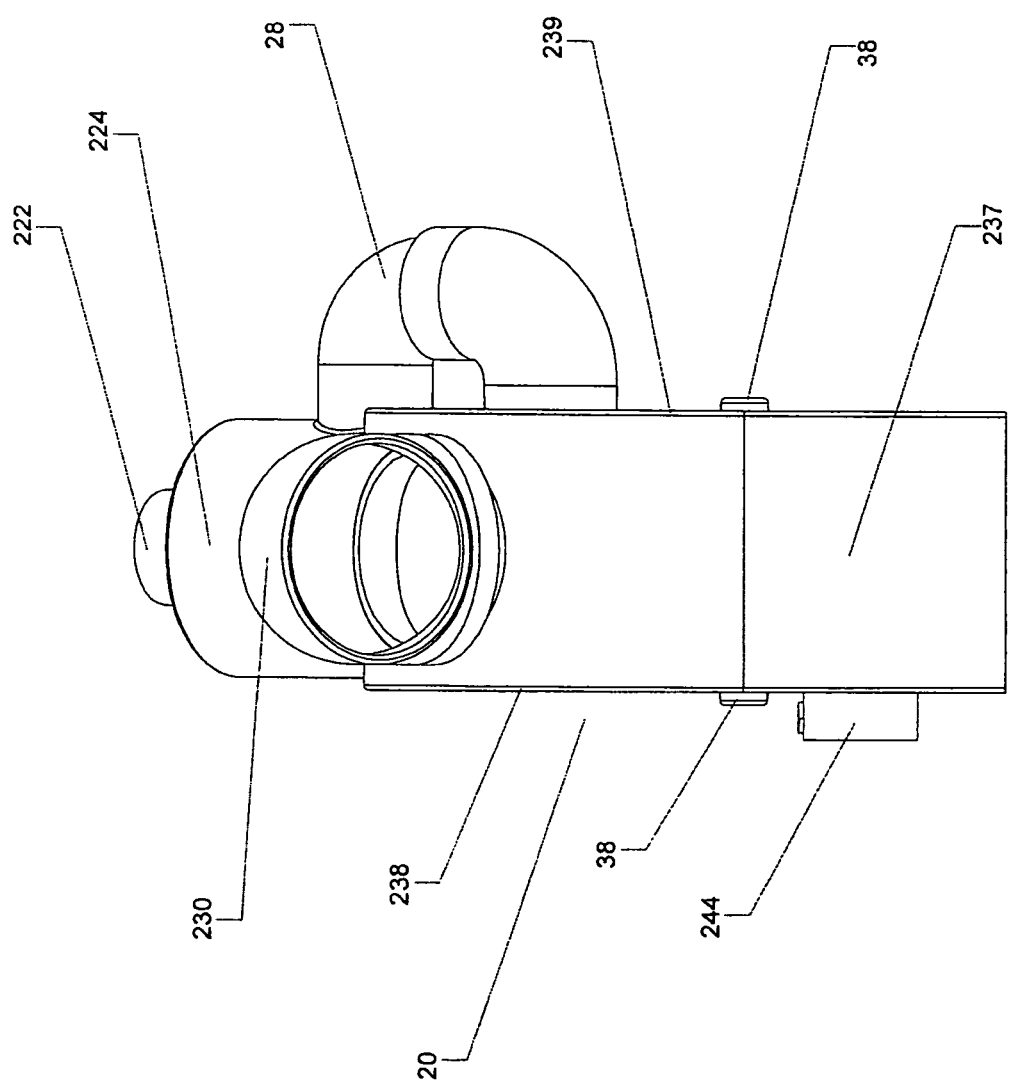

FIG. 30 is a plan view of a third embodiment of the instant inventive strainer device 10 showing the exterior of the strainer housing 20 with the attached pre-strainer housing 224, pre-strainer housing fitting 222, filtered suction outlet fitting 244, and shunt 28.

Figure 31:
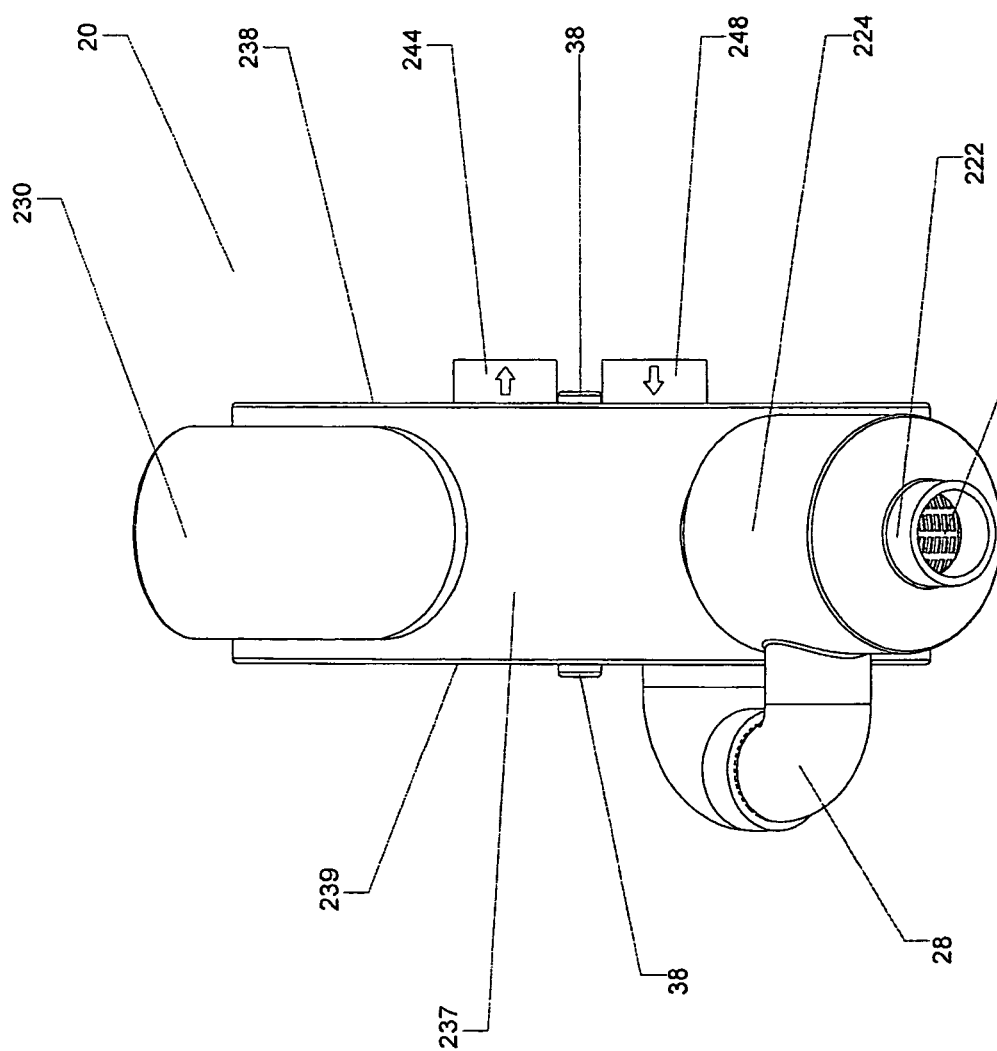

FIG. 31 is a top view of a third embodiment of the instant inventive strainer device 10 showing the exterior of the strainer housing 20 with the attached pre-strainer housing 224, pre-strainer housing fitting 222, backwash inlet fitting 248, filtered suction outlet 244, backwash outlet fitting 230, shunt 28, and stem 38.

Figure 32:
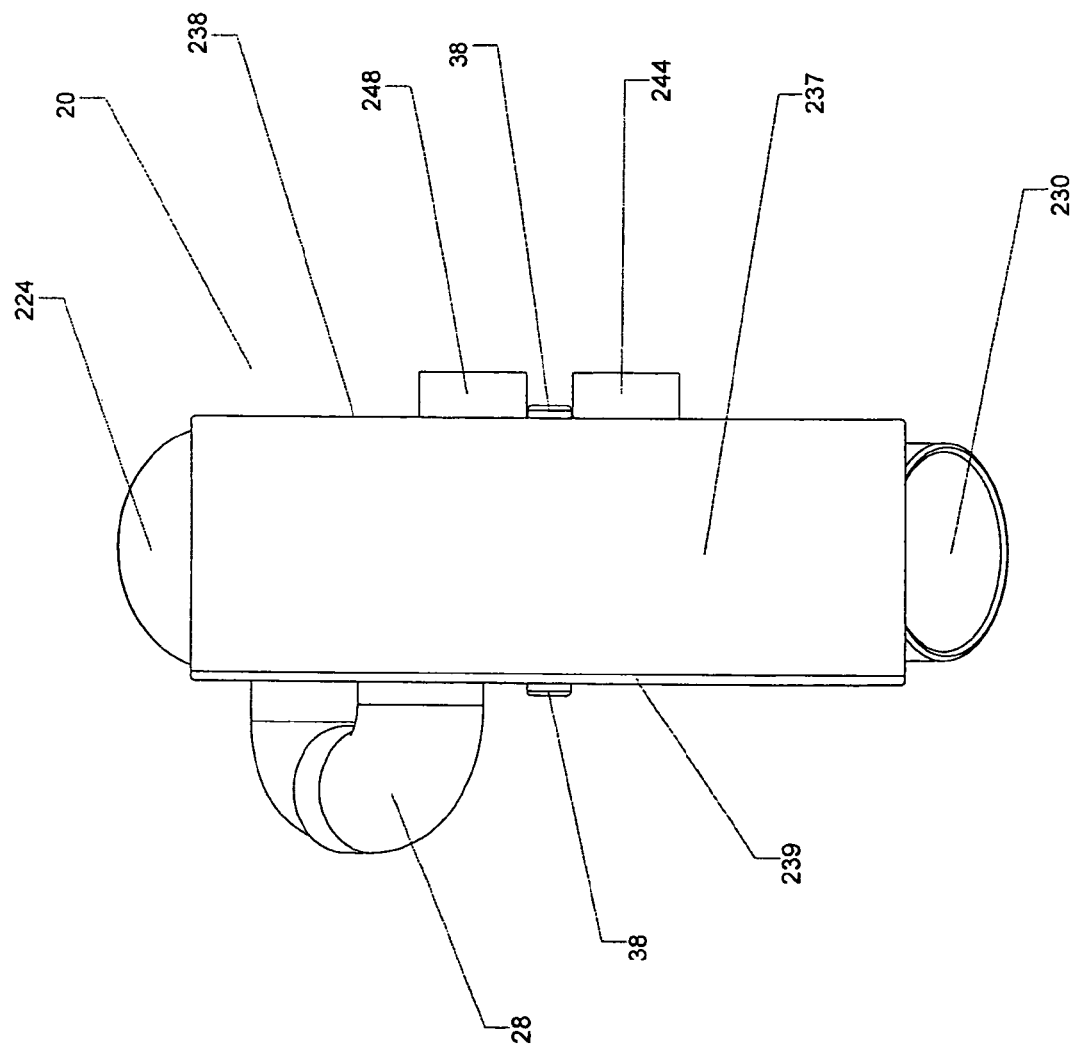

FIG. 32 is a bottom view of a third embodiment of the instant inventive strainer device 10 showing the exterior of the strainer housing 20 with the attached pre-strainer housing 224, backwash inlet fitting 248, filtered suction outlet 244, backwash outlet fitting 230, shunt 28, and stem 38.

Figure 33:
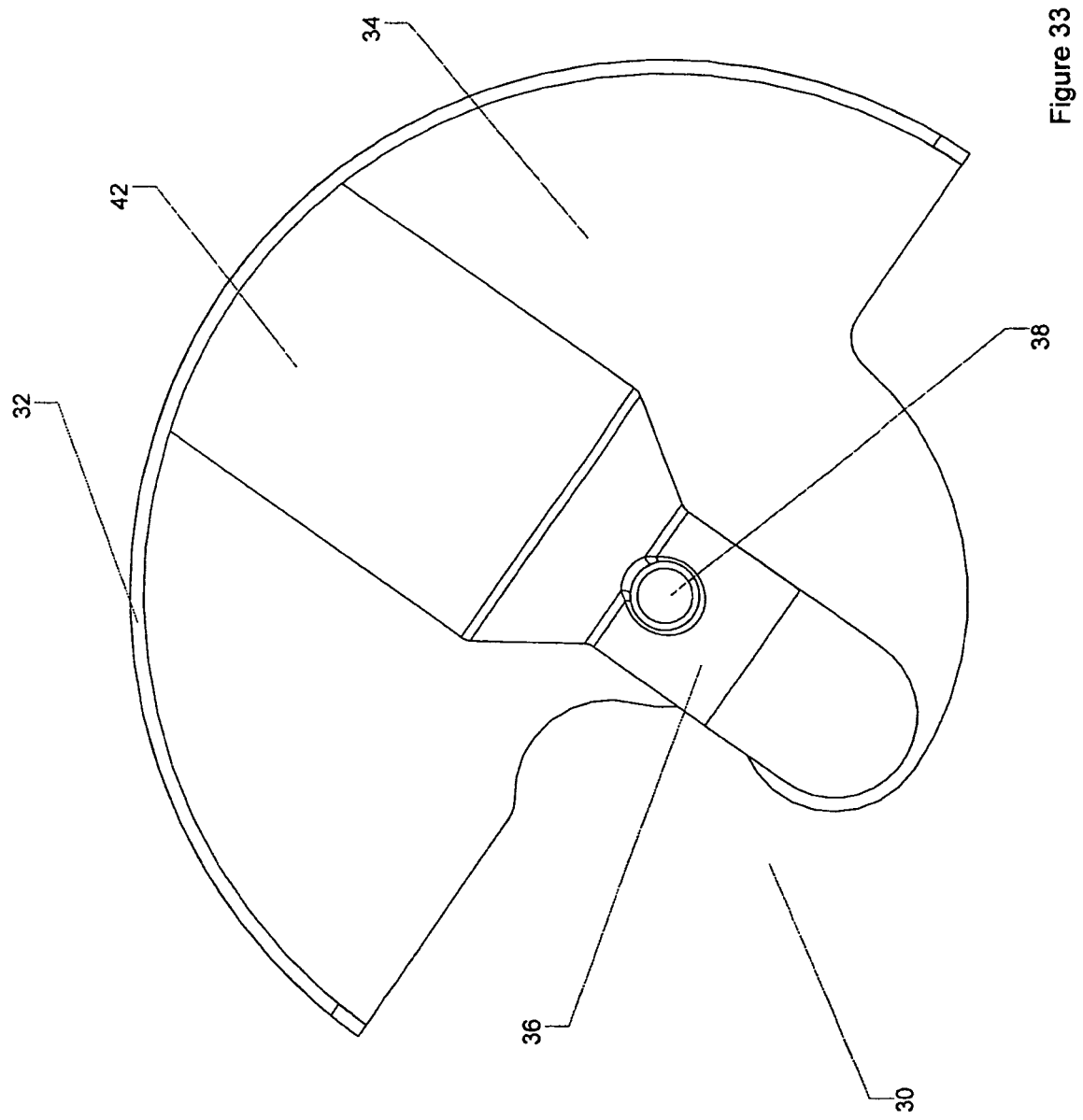

FIG. 33 is a detailed view of a third embodiment of the instant inventive strainer device 10 showing the trim assembly 30 components.

Figure 34:
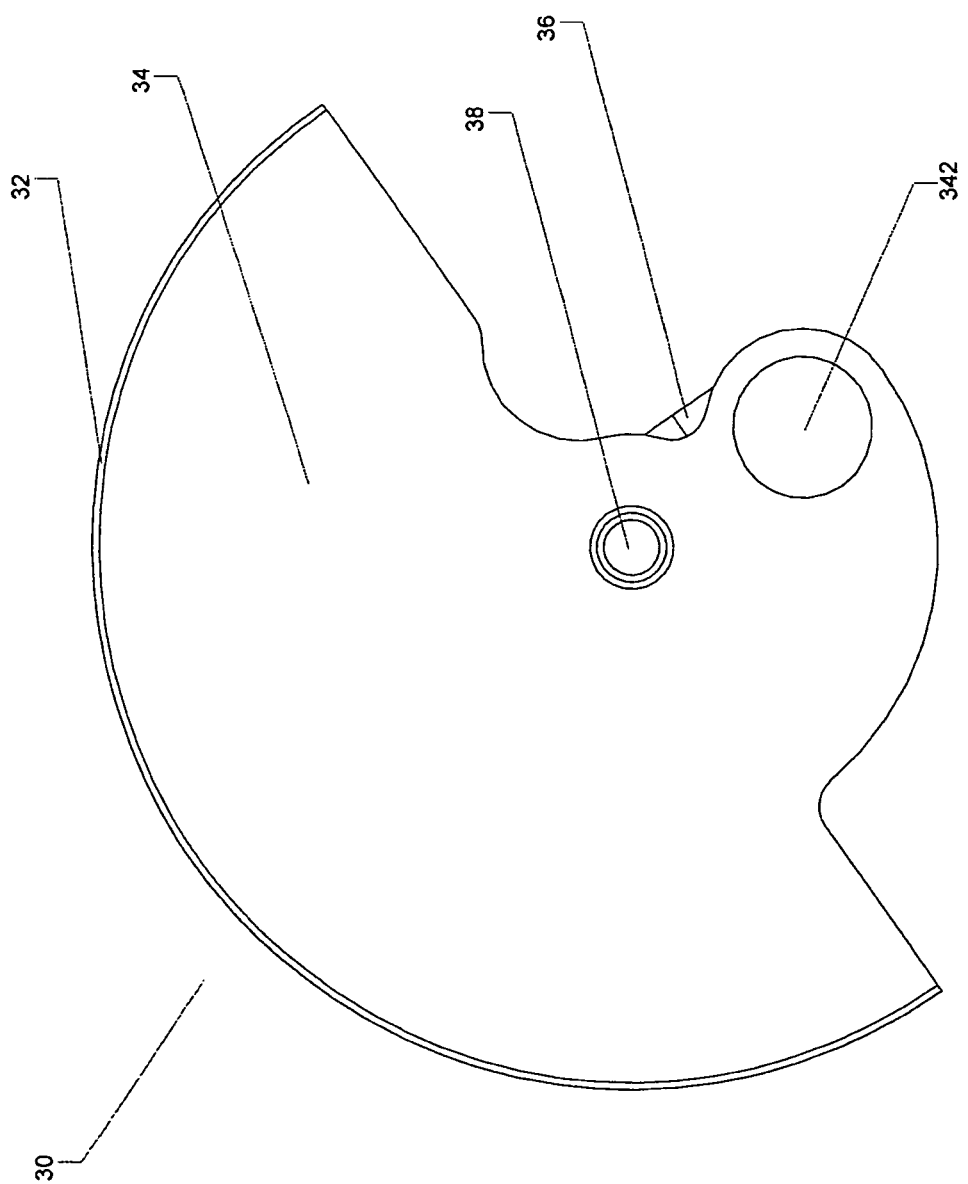

FIG. 34 is a detailed plan view of a third embodiment of the instant inventive strainer device 10 showing the trim assembly 30 components.

Figure 35A:
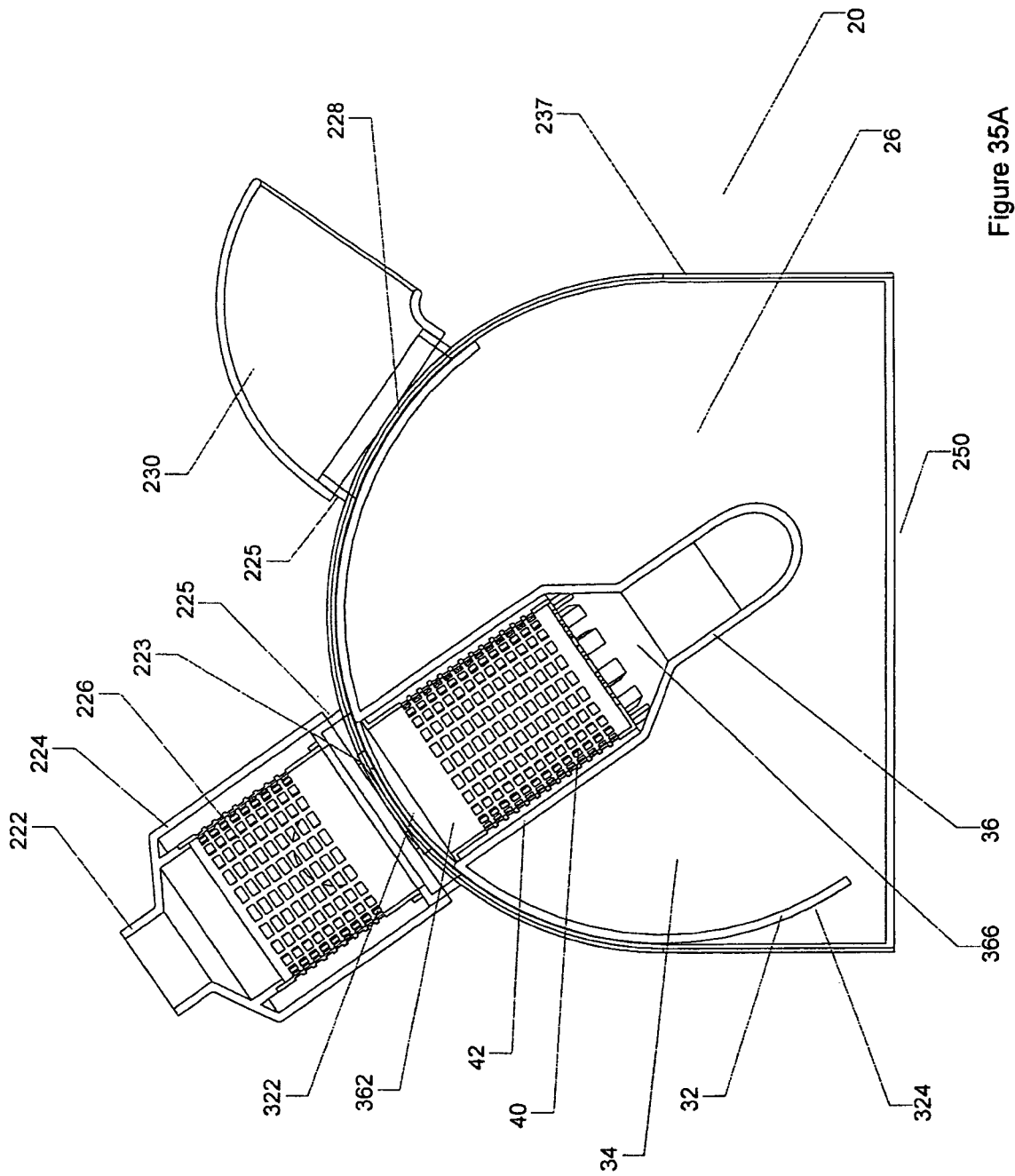

FIG. 35A is a cross section view of a third embodiment of the instant inventive strainer device 10 showing the trim assembly 30 in the straining position.

Figure 35B:
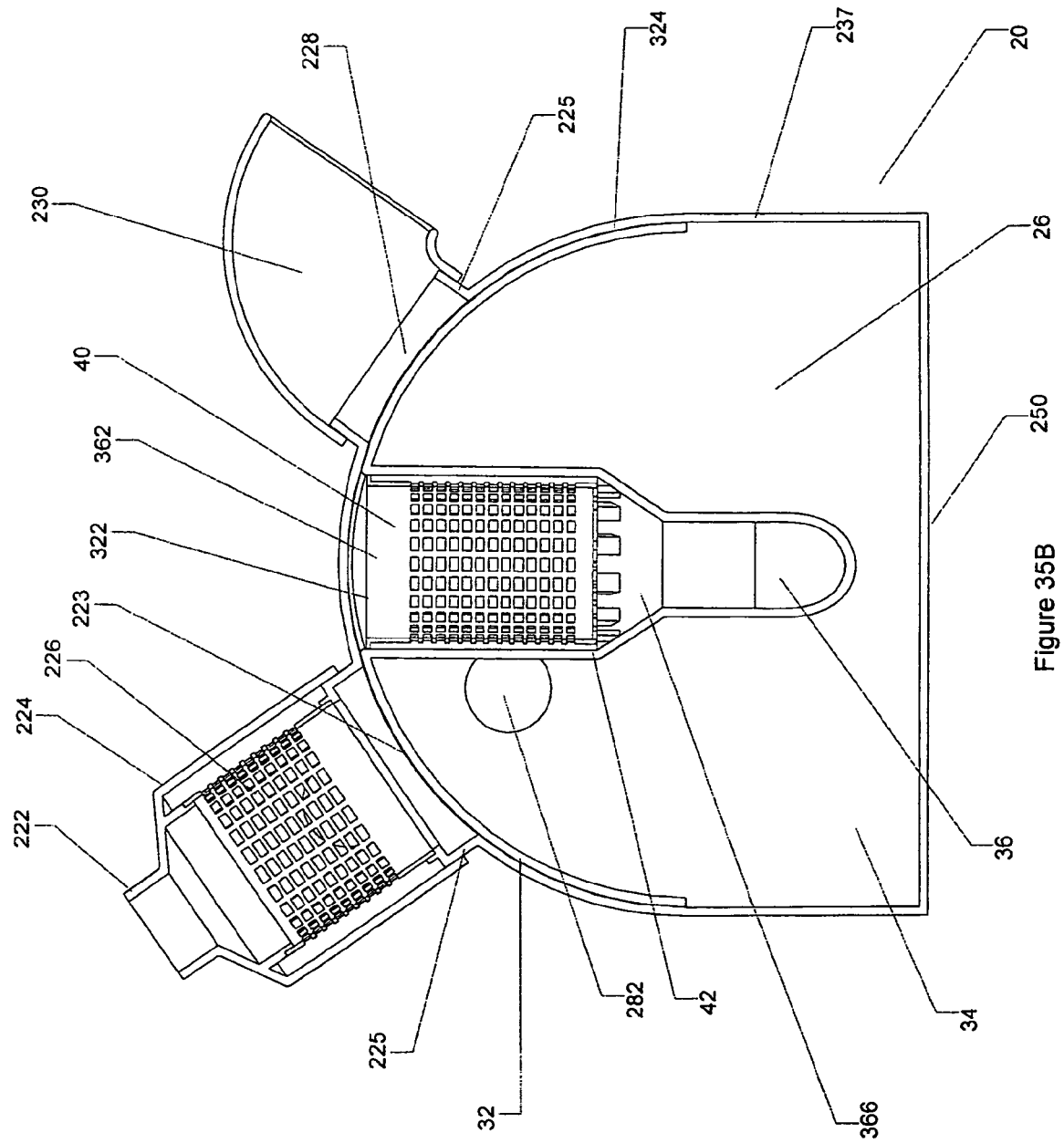

FIG. 35B is a cross section view of a third embodiment of the instant inventive strainer device 10 showing the trim assembly 30 in a position between the straining position and the backwashing position.

Figure 35C:
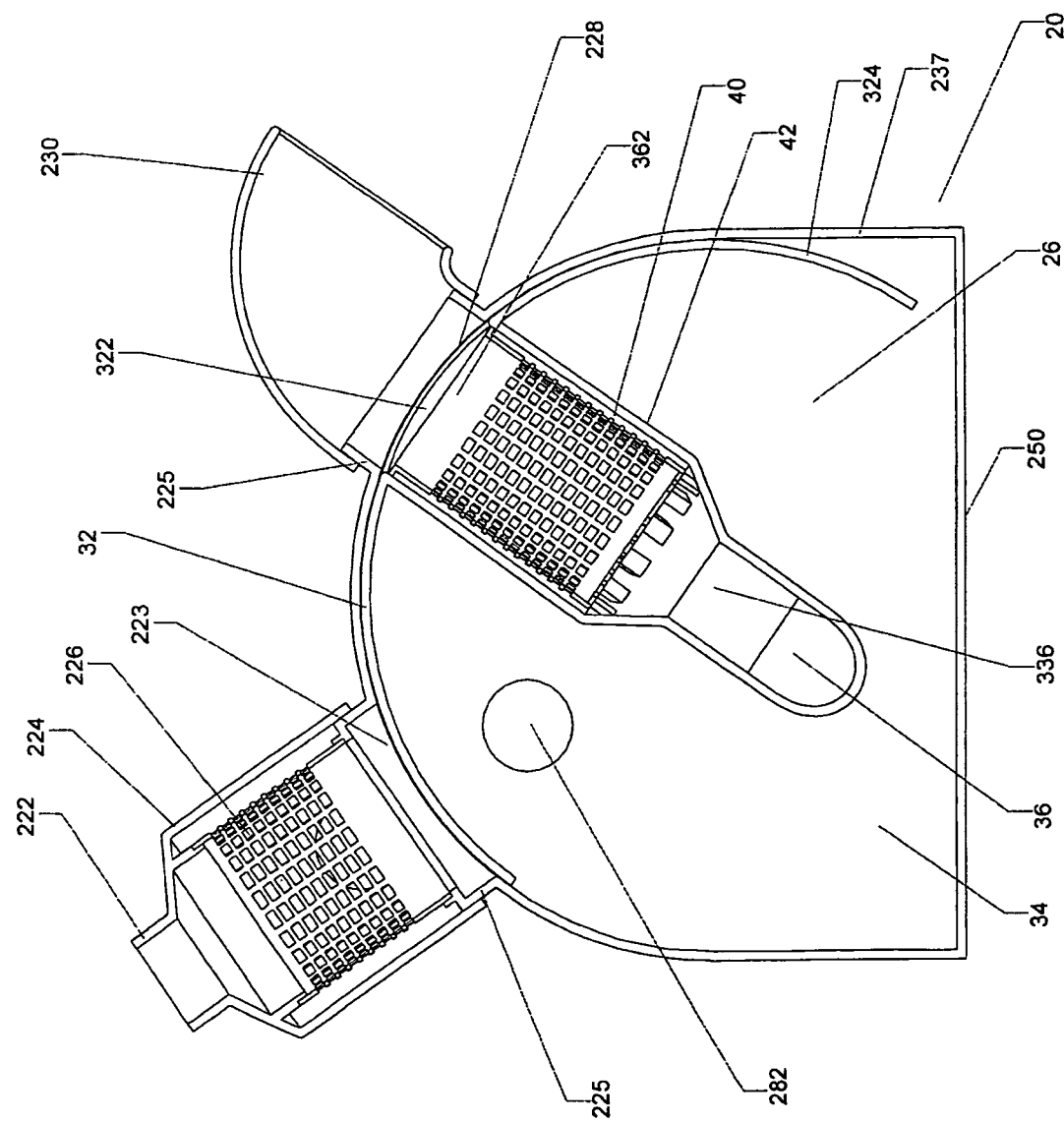

FIG. 35C is a cross section view of a third embodiment of the instant inventive strainer device 10 showing the trim assembly 30 in a backwashing position.

DETAILED DESCRIPTION OF THE PREFERRED EMBODIMENTS

Referring to FIGS. 1, 2, 12, 13, 24 and 25, the basic strainer assembly 10 is shown in isometric views as part of a pool circulation system. The pool 01 is filled with water and fluidly connected to the basic strainer assembly 10 by at least one pool suction line or pipe 02. The circulation pump 04 is fluidly connected to the strainer assembly 10 by a suction line or pipe 03. A filter media 06 is fluidly connected to the discharge side of the circulation pump 04 by a discharge pipe or line 05. The filter media 06 is further fluidly connected to the pool 01 by a return line or pipe 07. When the circulation pump 04 is operating, water from the pool 01 is drawn through the pool suction line 02, the basic strainer assembly 10 and suction line 03 to feed the circulation pump 04. Water is then discharged under pressure from the operating circulation pump 04 to flow through the filter media 06 by a discharge line 05. Water that flows under pressure from the filter media 06 is transported back to the pool 01 by a return line 07. This arrangement provides a closed circulation system whereby debris is strained or separated from the water by the strainer assembly 10 before or upstream of the circulation pump 04. The pool circulation system will operate in this arrangement until the strainer assembly 10 requires cleaning.

When the strainer assembly 10 requires cleaning, the water flow on the suction side of the pool circulation pump 04 is altered by a trim assembly 30 within the strainer assembly 10 to backflow in and dislodge debris from the strainer assembly 10 and discharge outside the pool circulation system by a backwash outlet 228 into a catch box 50. See FIGS. 2, 13 and 25. The configuration of the trim assembly 30 within the housing 20 allows the backwashing of the strainer assembly 10 without disrupting the circulation pump 04. A more detailed description of the strainer assembly 10 is set forth below.

The exterior views of the strainer assembly 10 are depicted in FIGS. 3 through 8 for the first embodiment, FIGS. 14-20 for the second embodiment and FIGS. 26-32 for the third embodiment. Cross sectional views of each embodiment are depicted in FIGS. 10A-B, 22 and 35A-C. In each embodiment, a cavity 26 is formed inside a housing 20 as shown in FIGS. 10A-B, 22, and 35A-C. In at least two embodiments, a first housing section 22 having a general shape of a frustrum of a cone which is fastened by conventional fasteners and seals to a second housing section 24 having a similar general shape of a frustrum of a cone to make a watertight housing 20 with a large circular mid-body cross section. See FIGS. 3 through 7 and FIGS. 14 through 18. In at least two embodiments, the first housing section 22 is above the second housing section 24. See FIGS. 3 and 14. In another embodiment, housing 20 includes a "D" shaped ring 237 capped on each end by end plates 238 and 239 to form a cavity 26 with a "D" shape. See FIGS. 26 through 35A-C. In each embodiment, the cavity 26 holds a trim assembly 30. See FIGS. 9A-D, FIGS. 21B-21C and FIGS. 35A-C.

FIGS. 5, 9A, 14, 21A and 26 show the fixation of a pre-strainer suction fitting 222, a strainer housing 224, a backwash outlet fitting 230, a filtered suction outlet fitting 244, a backwash inlet fitting 248, and a shunt 28 attached to the outer surface of housing 20. Each of these fittings is attached to the outer surface of housing 20 by means of fasteners (such as screws and/or bolts) or formed fitted over a lip 225 extending from the outer surface of housing 20 as shown in FIGS. 27, 28, and 35A through 35C. Each fitting it fluidly connected to cavity 26 by either an inlet or outlet as described more fully below.

As shown in FIGS. 9A, 14, 21A and 26, pre-strainer suction fitting 222 is fluidly connected to a strainer housing 224 by conventional fixation methods known (such as fasteners) or extends from the strainer housing 224 as depicted in FIGS. 35A through 35C. The pre-strainer suction fitting 222 is connected to the water in a pool 01 by a suction line 03.

It is contemplated that strainer housing 224 is fluidly connected to a pre-strainer suction inlet 223 formed through the first housing section 22. See FIGS. 9A, 9C, 21A or FIGS. 35A through 35C. Preferred embodiments of fixation of the strainer housing 224 over the pre-strainer suction inlet 223 to maintain a fluid tight connection contemplates the use of a seal 236 disposed within a channel or groove 235 formed in the interior surface of cavity as depicted in FIG. 9 or the use of a cover 234 and a seal 236 as depicted in FIGS. 21A and 22 or form fitted fixation over a lip 225 extending from the outer surface of the housing 20 as shown in FIGS. 27, 28, and 35A through 35C. In a preferred embodiment, seal 236 fits within pre-strainer suction inlet 223 and extends slightly inwardly into cavity 26 and is held in place by the seal cover 234 as shown in FIGS. 9A, 10A, 10B, 21A and 22. In such a preferred embodiment, strainer housing 224 is fastened to seal cover 234 by conventional fasteners. In each of the embodiments, a strainer 226 is fixed within a strainer housing 224. See FIGS. 21A, 22 and 35A through 35C. In this configuration, water is drawn from the pool 01, through the pool suction line 02, the pre-strainer suction fitting 222, the raw water strainer housing 224 and into the strainer 226. The raw water strainer 224 operates to separate or strain and retain large debris from the water before passing into the cavity 26.

A shunt 28 is fluidly connected between the strainer housing 224 and the shunt inlet 282 formed in the housing 20. See FIGS. 10A, 22, and 35B. In a preferred embodiment, shunt 28 is integral with the strainer housing 224 and the shunt inlet 282 is formed in the first housing section 22. See FIG. 10A. In another preferred embodiment, shunt 28 is separate and apart from the strainer housing 224 as depicted in FIGS. 21B and 29; and the shunt inlet 282 is formed in either the first housing section 22 or the second housing section 24. See FIGS. 21B and 29. Shunt 28 allows water to be drawn from the pool 01 into the cavity 26 through strainer housing 224. See FIGS. 10A, 10B, 22, and 35A through 35C.

A backwash outlet 228 is formed in and through the exterior surface of housing 20. See FIGS. 9A, 9B, 21A, 21C and 35C. A backwash fitting 230 is fixed to and extends away from the exterior surface of housing 20 over the backwash outlet 228. See FIGS. 9A, 9B, 21A, 21C and 35C. Fixation of the backwash fitting 230 over the backwash outlet 228 formed in the outer surface of the housing 20 is achieved through the use of a seal cover 236 and a seal 238 as depicted in FIGS. 21A and 21C. The seal 236 fits within backwash outlet 228 and extends slightly inwardly into the cavity 26 and is held in place by the seal cover 234. The backwash outlet fitting 230 is fastened to the seal cover 234 by conventional fasteners. See FIG. 8. The backwash outlet fitting 230 directs water and debris away from the housing 20 and into catch box 50. See FIGS. 1, 2, 12, 13, and 25.

As shown in FIGS. 9C, 10A, 10B, 21B, 21C, 27 and 28, a stem 38 extends through a stem borehole 232 formed in and through an exterior surface of housing 20 to rotate a trim assembly 30 located within cavity 26. In a preferred embodiment, stem 38 is rotated by a conventional handle and/or an actuator located exterior to the housing 20.

A filtered suction outlet 242 is formed in and extends through an outer surface of housing 20 into cavity 26. See FIGS. 4, 10A, 10B, 21C, 22 and 27. In a preferred embodiment, filtered suction outlet 242 is formed in a second housing section 24. See FIGS. 4, 10A, 10B, 21C and 22. In another preferred embodiment, filtered suction outlet 242 is formed in a first D shaped end plate 238. See FIG. 27. A filtered suction outlet fitting 244 is fixed to the outer surface of housing 20 over a filtered suction outlet 242. Filtered suction outlet fitting 244 is fluidly fixed to pump 04 by a suction line 03. See FIGS. 2, 13, and 25.

A backwash inlet 246 is formed in and extends through an outer surface of housing 20 into cavity 26. See FIGS. 21C and 27. A backwash inlet fitting 248 is fixed to the outer surface of housing 20 over the backwash inlet 246. The backwash inlet fitting 248 is fluidly connected to the pump 04 by a discharge line 05. See FIGS. 2, 13 and 25. As described above, the circulation pump 04 draws water through the filtered suction outlet fitting 244 and discharges the water through a discharge line 05. The discharge line 05 is bifurcated and one leg is fluidly connected to a filter media 06 and the second leg is fluidly connected to the backwash inlet fitting 248. Until the strainer assembly 10 requires cleaning, water discharged by the circulation pump 04 flows through the filter media 06 to separate very small particles and debris from the water. Thereafter the water is returned to the pool 01 by a return line 07. See FIGS. 2, 13 and 25.

FIGS. 3 through 6, FIGS. 14 through 19 and FIGS. 35A through 35C depict a base 250 upon which housing 20 rests. In a preferred embodiment, base 250 is at least two arcuate legs that are fixed to and extend away from the exterior surface of housing 20. See FIGS. 8 and 20. In another embodiment, base 250 is integral to the lower region of housing 20. Regardless of the form, base 250 provides a stable foundation to hold the strainer assembly 10 in a stable upright position.

The angle between the pre-strainer suction inlet 222 and the backwash outlet 228, known as the first angle, is approximately between the range of approximately 60 degrees and approximately 180 degrees. See FIGS. 7, 19 and 27. In a preferred embodiment, the first angle between the pre-strainer suction inlet 222 and the backwash outlet 228 is approximately 140 degrees. In another preferred embodiment, the first angle is approximately 90 degrees. The angle between the filtered suction outlet 242 and the backwash inlet 246, known as the second angle, is approximately between the range of approximately 60 degrees and approximately 180 degrees. See FIGS. 7, 19, and 27. In a preferred embodiment, the first angle and the second angle are the same. These angles determine the rotational travel or arc of rotation for valve stem 38 and trim assembly 30 between a strainer position and a backwash position.

As mentioned above, a trim assembly 30 is positioned in cavity 26 and configured to rotate between a strainer position and a backwash position. In a preferred embodiment, the angle of rotation of the trim assembly 30 between the strainer position and the backwash position is the same angle as the first angle. In another preferred embodiment, the angle of rotation of the trim assembly 30 between the strainer position and the backwash position is the same angle as the second angle.

As depicted in FIGS. 9A through 9D, 21B, 21C, 23A, 23B, 33 and 34, the trim assembly 30 includes a conduit 36 fixed to a stem 38 between a first shutter plate 32 and a second shutter plate 34. The conduit 36 has a first conduit end 362 and a second conduit end 364. The conduit 36 is tilted or inclined at an angle between approximately 20 degrees and approximately 80 degrees from the vertical when the trim assembly 30 in the strainer or backwash position. In a preferred embodiment, the angle of incline is approximately 30 degrees.

The first shutter plate 32 and second shutter plate 34 each have an outer surface 324 that is distal to the conduit 36 and each shutter plate 32 and 34 also have a mounting surface 326 that is proximal to conduit 36. See FIGS. 9A, 9B, 9C, 9D, 10A, 10B, 11A, 11B, 21B, 21C, 22, 23B, and 35A through 35C. The first shutter plate 32 is shaped to slide about a portion of an inner housing surface proximal to the suction inlet 223 and the backwash outlet 228. See FIGS. 9B, 9C, 10A, 10B, 21B, 21C, 22, and 35A through 35C. A first aperture 322 is formed through the first shutter plate 32. The first shutter plate 32 is fixed to the first conduit end 362 and aligned with bore 366. See FIGS. 9B, 9C, 21B, 21C, 23B, 35A through 35C. The second shutter plate 34 is shaped to slide about a portion of an inner housing surface proximal to the filtered suction outlet 242 and backwash inlet 246. See FIGS. 11A, 11B, 21C, 23A, 23B, and 35A through 35C. A second aperture 342 is formed through the second shutter plate 34. The second shutter plate 34 is fixed to the second conduit end 364 and aligned with bore 366. See FIGS. 11A, 11B, 21C, 23A, 23B, and 35A through 35C. In a preferred embodiment, a stop 249 extends outward from the interior surface of the housing 20 to engage the second shutter plate 34 and prevent rotation of the trim assembly 30 beyond the pre-determined arc of travel. See FIG. 10B. The placement and thickness of stop 249 determines the trim assembly's 30 arc of travel and alignment of outlets 228 and 242 and inlets 223 and 246 with conduit ends 362 and 364.

When trim assembly 30 is in the straining position, the first aperture 322 is aligned with the suction inlet 223 to allow liquid to pass from the strainer housing 224 into conduit 36 and the first shutter plate 34 fluidly blocks the backwash outlet 228. See FIGS. 10A, 10B, 21B, 21C and 35A through 35C. Likewise when the trim assembly 30 is in the straining position, the second aperture 342 is aligned with the filtered suction outlet 242 to allow liquid to pass from the conduit 36 to the filtered suction outlet fitting 244 and the second shutter plate 34 fluidly blocks the backwash inlet 246. See FIGS. 10A, 10B, 21B, 21C, and 35A through 35C.

When trim assembly 30 is in the backwash position, the first aperture 322 is aligned with the backwash outlet 228 to allow liquid to pass from the conduit 36 into the backwash outlet fitting 230 and the first shutter plate 34 fluidly blocks the suction inlet 223. Likewise when the trim assembly 30 is in the backwash position, the second aperture 342 is aligned with the backwash inlet 246 to allow liquid to pass from the backwash inlet fitting 248 to the conduit 36. It is important to note that the second shutter plate 34 does not fluidly block the filtered suction outlet 242 when the trim assembly 30 is in the backwash position. See FIGS. 10A, 10B, 21B, 21C, and 35A through 35C.

As described above, in a preferred embodiment, a seal 236 extends from suction inlet 223 into cavity 26 and further makes sealing contact between the first housing section 22 and the first shutter plate 32 to promote a liquid tight connection between the bore 366 at the first conduit end 362 and the suction inlet 223 when the trim assembly 30 is in the strainer position. See FIGS. 10A, 10B and 22. Similarly, when the trim assembly 30 is in the backwash position, the seal 236 extending from backwash outlet 228 into cavity 26 makes sealing contact with the first shutter plate 32 to promote liquid tight connection between the bore 366 at the first conduit end 362 and the backwash outlet 228. The sealing arrangement between the second shutter plate 34 and the second housing section 24 includes a seal 346 that is mounted to the second shutter plate 34 by a retainer 345. See FIGS. 11A, 11B, 23A, and 23B. In a preferred embodiment, a ladder 349 is fixed to the second housing section to further retain seal 346 in position. See FIGS. 11A and 11B. Seal 346 promotes a liquid tight connection between second shutter plate 34 and the bore 366 at the second conduit end 364 and the filtered suction outlet 242. It is contemplated that the liquid tight connections between the trim assembly 30 and the housing 20 by seals 236 and 246 are able to withstand 25" vacuum and 60 psi.

As depicted in FIGS. 9A, 10A, 10B, 21B, 22 and 35A through 35C, a basket basket strainer 40 is fixed in the bore 366 of conduit 36 near the first end 362. In a preferred embodiment, the bore 366 is tapered. Further in a preferred embodiment, a basket basket strainer 40 is fixed within the larger region of the tapered bore 366 and is located at the first conduit end 362. In another preferred embodiment, the basket basket strainer 40 is in the form of a basket and when the trim assembly is in the straining position, debris is separated from the liquid and retained in the basket basket strainer 40. See FIGS. 9A, 10A, 10B, 21B, 22 and 35A through 35C. When the basket basket strainer 40 requires cleaning or backwashing, the water flow is reversed by moving the trim assembly 30 from the straining position to the backwash position. As water flows from bottom to top of the conduit 36, debris is lifted out of the basket basket strainer 40 and transported to through the backwash outlet 228.

When the trim assembly 30 is in a strainer position, the suction inlet 223, the first aperture 322, conduit 36, second aperture 342 and filtered suction outlet 242 are aligned to allow liquid to pass through basket basket strainer 40 positioned within a conduit 36 and simultaneously block the backwash outlet 228 and backwash inlet 246 by their respective shutter plates 32 and 34. When the trim assembly 30 is in a backwash position, the backwash outlet 228, the first aperture 322, conduit 36, second aperture 342 and backwash inlet 246 are aligned to allow water to pass through basket strainer 40 positioned within conduit 36 and simultaneously block only the pre-strainer suction inlet 222 by the first shutter plate 32. When the trim assembly 30 is in the backwash position, the filtered suction outlet 244 is open to the cavity 26 to draw liquid from shunt 28 via cavity 26. See FIGS. 21C and 35C.

The inlets 223 and 246, outlets 228 and 242, shunt inlet 282 and the shutter plates 32 and 34 operate together to direct water through the strainer assembly 10. In the strainer position, the trim assembly 30 blocks the backwash inlet 246 and backwash outlet 228 and allows water to flow from the pre-strainer suction inlet 223 through the basket strainer 40 to the filtered suction outlet 242. The shunt inlet 282 floods and keeps the cavity 26 filled with liquid from the strainer housing 224. In the backwash position, trim assembly 30 blocks only the pre-strainer suction inlet 223 and the liquid flows from the shunt inlet 282 through cavity 26 and through the filtered suction outlet 242 to the pump 04. Liquid under pressure from the discharge side of the pump 04 flows through the open backwash inlet 246, through the basket strainer 40 to the open backwash outlet 228. As the trim assembly 30 is moved between the strainer and backwash positions, the flow of liquid through the filtered suction outlet 242 never stops.

Although the present invention and its advantages have been described in detail, it should be understood that various changes, substitutions and alterations can be made herein without departing from the spirit and scope of the invention as defined by the claims set forth below.

What is claimed is:

1. a strainer device for straining debris from a fluid source on the suction side of a pump, the strainer device comprising:
   (a) a housing body comprising,
      an outer housing surface,
      a single cavity defined by an inner housing surface,
      a suction inlet passing through a first end region of said housing body,
      an open ended strainer fixed in a strainer housing fluidly connected to said suction inlet, wherein said strainer housing is fluidly connected to a source of fluid by a strainer suction fitting,
      a backwash outlet passing through said first end region of said housing body,
      a filtered suction outlet passing through a second end region of said housing body, wherein said filtered suction outlet is fluidly connected to the suction side of the pump,
      a backwash inlet passing through said second end region of said housing body into said single cavity, wherein said backwash inlet is fluidly connected to a discharge side of the pump,
      a stem borehole passing through said housing body,
      a central axis of said housing body coaxial with said stem borehole and extending through said single cavity and beyond said housing body,
      wherein said suction inlet is separated from said backwash outlet by a first angle defined as an angle greater than or equal to approximately 60 degrees but less than or equal to approximately 180 degrees as measured from the center of said suction inlet to said central axis and to the center of said backwash outlet, and
      wherein said filtered suction outlet is separated from said backwash inlet by a second angle defined as an angle greater than or equal to approximately 60 degrees but less than or equal to approximately 180 degrees as measured from the center of said filtered suction outlet to said central axis and to the center of said backwash inlet;
   (b) a trim assembly positioned within said single cavity of said housing body, said trim assembly being rotatable about said central axis between a strainer position and a backwash position, said trim assembly comprising,
      a bore formed in a conduit with first and second conduit ends,
      a basket strainer fixed in a basket strainer housing, said basket strainer fluidly connected to said bore,
      said basket strainer housing and said conduit disposed between first and second shutter plates,
      said first shutter plate having an outer surface distal to said conduit and shaped to slide over a portion of said inner housing surface proximal to said suction inlet and said backwash outlet to fluidly block said backwash outlet and simultaneously fluidly couple said suction inlet to said conduit when said trim assembly is in said strainer position and further fluidly couple said backwash outlet to said conduit and simultaneously fluidly block said suction inlet when said trim assembly is in said backwash position, said second shutter plate having an outer surface distal to said conduit and shaped to slide about a portion of said inner housing surface proximal to said filtered suction outlet and said backwash inlet to fluidly block said backwash inlet and simultaneously fluidly couple said filtered suction outlet to said conduit when said trim assembly is in said strainer position and further fluidly couple said backwash inlet to said conduit but not block said filtered suction outlet when said trim assembly is in said backwash position, and a stem attached to and extending away from said conduit, wherein said stem is coaxial with said central axis and at least a portion of said stem extends through said stem borehole to allow rotation of said trim assembly between said strainer and backwash second positions from a location external to said outer housing surface; and (c) a shunt fluidly connected between strainer housing and said single cavity to allow fluid to flood said single cavity regardless of said trim assembly's position and further direct fluid to flow across said open ended strainer when said trim assembly is in said backwash position.

2. The strainer device of claim 1, wherein said stem is positioned vertically, and said conduit is tilted from the vertical at an angle between approximately 20 degrees and approximately 80 degrees, said housing further comprises a first housing section and a second housing section, wherein each of said housing sections has a general shape of a frustrum of a cone that when joined with the first housing section above the second housing section at their respective large bases creates a single cavity with a large circular mid-body cross section, and said suction inlet is contra-positioned from the suction outlet and said backwash outlet is contra-positioned from said backwash inlet.

3. The strainer device of claim 2, wherein said shunt is fluidly connected to said single cavity at said first housing section.

4. The strainer device of claim 2, wherein said shunt is fluidly connected to said single cavity at said second housing.

5. The strainer device of claim 1, wherein said housing further comprises a ring with a "D" shaped cross section capped at each open end by a first end plate and a second end plate in opposition to each other to form a "D" shaped single cavity; said first shutter plate having an arcuate shape conforming with an arcuate portion of said single cavity; said second shutter plate having an arcuate upper region conforming with said arcuate portion of said single cavity; said first shutter plate fixed to an upper periphery of said second shutter plate at a generally ninety degree angle; and said stem is positioned horizontally.

6. The strainer device of claim 1, wherein said bore is tapered.

7. The strainer device of claim 1, wherein said trim assembly is rotated between said strainer position and said backwash position by an actuator mounted on said stem.

8. A strainer device for straining a source of liquid on the suction side of a pump, the strainer device comprising:
a single cavity formed in a housing, said single cavity having an inner housing surface;

a trim assembly rotatably fixed within said single cavity, said trim assembly being rotatable about a central axis between a strainer position and a backwash position by a stem extending from said trim assembly and through said housing, said trim assembly comprising,
a conduit with a first conduit end and a second conduit end, said conduit extending across a substantial portion of said single cavity,
a bore formed in said conduit and open at said first and second ends,
a basket strainer disposed within said bore,
a first shutter plate formed around and extending away from a periphery of said first conduit end,
a second shutter plate formed around and extending away from a periphery of said second conduit end;

an open ended strainer fixed within a strainer housing, said strainer housing fixed on an exterior housing surface and fluidly connected between the source of liquid and said single cavity by a shunt irrespective of the position of said trim assembly and further fluidly connected between the source of liquid and said first conduit end when said trim assembly is in said strainer position;

a filtered suction outlet fitting fixed on said exterior housing surface distal to said strainer housing and fluidly connected between said single cavity and the suction side of the pump when said trim assembly is in said backwash position and fluidly connected between said second conduit end and the suction side of the pump when said trim assembly is in said strainer position;

a backwash inlet fitting fixed on said exterior housing surface at an angular separation of greater than or equal to approximately 60 degrees but less than or equal to approximately 180 degrees from said filtered suction outlet fitting, said backwash inlet fluidly connected between a discharge side of the pump and said second conduit end when said trim assembly is in said backwash position; and a backwash outlet fitting fixed on said exterior housing surface distal to said backwash inlet fitting and further at an angular separation of greater than or equal to approximately 60 degrees but less than or equal to approximately 180 degrees from said basket strainer housing, said backwash outlet fitting fluidly connected to said first conduit end when said trim assembly is in said backwash position.

9. The strainer device of claim 8, wherein said bore is tapered.

10. The strainer device of claim 8, wherein said trim assembly is rotated between said strainer position and said backwash position by an actuator mounted on said stem.

11. A strainer device for straining liquid on the suction side of a pump, the strainer device comprising:
a housing body comprising,
a first housing section and a second housing section, wherein each of said housing sections has a general shape of a frustrum of a cone that when joined at their respective large bases creates a single cavity with a large circular mid-body cross section,
a stem borehole formed through said first housing section,
a central axis of said housing body coaxial with said stem borehole and passing through said cavity and said first housing section,
a suction inlet and a backwash outlet passing though said first housing section, wherein said suction inlet and said backwash outlet are separated from each other by a first angle in a plane normal to said central axis, a backwash inlet and a suction outlet passing through said second housing section, wherein said backwash inlet and said suction outlet are separated from each other by a second angle in a plane normal to said central axis, an open ended strainer fixed in a strainer housing fluidly connected to said suction inlet, wherein said strainer housing is fluidly connected to a source of liquid by a strainer suction fitting, said suction inlet is contra-positioned from said suction outlet and said backwash outlet is contra-positioned from said backwash inlet;

a trim assembly positioned within said single cavity of said housing body, said trim assembly being rotatable between a strainer position and a backwash position which defines an arc of travel of said trim assembly, said trim assembly comprising, an first shutter plate with a first aperture passing through a mating surface and a mounting surface of said first shutter plate, a second shutter plate with a second aperture passing through a mating surface and a mounting surface of said second shutter plate, a bore passing through a conduit fixed at a first conduit end to said mounting surface of said first shutter plate and further fixed at a second conduit end to said mounting surface of said second shutter plate, wherein said first and second apertures align with and extend said bore through said mating surfaces of said first and second shutter plates to fluidily connect said backwash outlet from said single cavity whenever said trim assembly is in said strainer position and further fluidly connect said backwash inlet to said backwash outlet and simultaneously fluidly block said suction inlet from said single cavity whenever said trim assembly is in said backwash position, and a bucket strainer fixed in a bucket strainer housing disposed between said first and second shutter plates and fluidly connected to said bore, a stop extending away from an interior surface of said second housing section into said single cavity to engage said second shutter and prevent the rotation of said trim assembly beyond said arc of travel, and a shunt fluidly connected between said raw strainer housing and said single cavity to allow liquid to flood said single cavity regardless of said trim assembly's position and further allow liquid to follow from said raw strainer housing to the suction side of the pump through said single cavity and said filtered suction outlet when said trim assembly is in said backwash position.

12. The strainer device of claim 11, wherein said first and second angle is at least approximately 60 degrees.

* * * * *